(12) United States Patent
Kitayama et al.

(10) Patent No.: US 6,399,247 B1
(45) Date of Patent: Jun. 4, 2002

(54) NICKEL-METAL HYDRIDE SECONDARY BATTERY

(75) Inventors: Hiroshi Kitayama; Hirotaka Hayashida, both of Takasaki; Masaaki Yamamoto, Inzai; Naomi Bando; Kunihiko Miyamoto, both of Tokyo; Hideharu Suzuki, Takasaki, all of (JP)

(73) Assignees: Toshiba Battery Co., Ltd., Tokyo; Kabushiki Kaisha Toshiba, Kawasaki, both of (JP)

( * ) Notice: Subject to any disclaimer, the term of this patent is extended or adjusted under 35 U.S.C. 154(b) by 0 days.

(21) Appl. No.: 09/513,890

(22) Filed: Feb. 25, 2000

(30) Foreign Application Priority Data

| Feb. 26, 1999 | (JP) | ............................................ 11-049412 |
| Aug. 25, 1999 | (JP) | ............................................ 11-238458 |
| Nov. 24, 1999 | (JP) | ............................................ 11-333276 |
| Feb. 9, 2000  | (JP) | ............................................ 2000-032149 |

(51) Int. Cl.⁷ .......................... H01M 4/32; H01M 10/22
(52) U.S. Cl. .................... 429/223; 429/218.2; 429/248; 429/344; 429/207; 252/62.2; 252/182.1
(58) Field of Search .............................. 429/218.2, 223, 429/231.5, 231.9, 218.1, 129, 247, 248, 251, 344, 206, 207, 188; 420/900; 252/62.2, 182.1; 423/53, 644

(56) References Cited

U.S. PATENT DOCUMENTS

| 5,506,069 A | * | 4/1996 | Ovshinsky et al. ............ 429/59 |
| 6,040,087 A | * | 3/2000 | Kawakami ................ 429/218.1 |
| 6,183,909 B1 | * | 2/2001 | Maeda et al. ................ 429/223 |

FOREIGN PATENT DOCUMENTS

| JP | 47-20635 | 9/1972 |
| JP | 50-132441 | 10/1975 |
| JP | A 62-108458 | 5/1987 |
| JP | A 3-78965 | 4/1991 |
| JP | A 5-289992 | 11/1993 |
| JP | A 8-88020 | 4/1996 |
| JP | A 8-190931 | 7/1996 |
| JP | A 8-222213 | 8/1996 |
| JP | A 9-213326 | 8/1997 |
| JP | A 10-63142 | 3/1998 |
| JP | A 10-69898 | 3/1998 |
| JP | A 10-106559 | 4/1998 |
| JP | A 10-172558 | 6/1998 |
| JP | A 10-241643 | 9/1998 |

* cited by examiner

*Primary Examiner*—Stephen Kalafut
*Assistant Examiner*—Raymond Alejandro
(74) *Attorney, Agent, or Firm*—Oblon, Spivak, McClelland, Maier & Neustadt, P.C.

(57) ABSTRACT

A nickel-metal hydride secondary battery comprising electrode group comprising positive electrode comprised mainly of nickel hydroxide, negative electrode comprised mainly of a hydrogen storage alloy, and separator being disposed between the positive electrode and the negative electrode, wherein the electrode group is sealed in battery casing, together with an alkali electrolyte liquid, wherein, in the battery, a W element and an Na element are present simultaneously. The nickel-metal hydride secondary battery of the present invention is advantageous not only in that it exhibits high utilization of the active material and excellent self-discharge characteristics in a high temperature storage as well as high charging efficiency in a high temperature environment, but also in that it has excellent large current discharge characteristics.

31 Claims, 1 Drawing Sheet

FIGURE
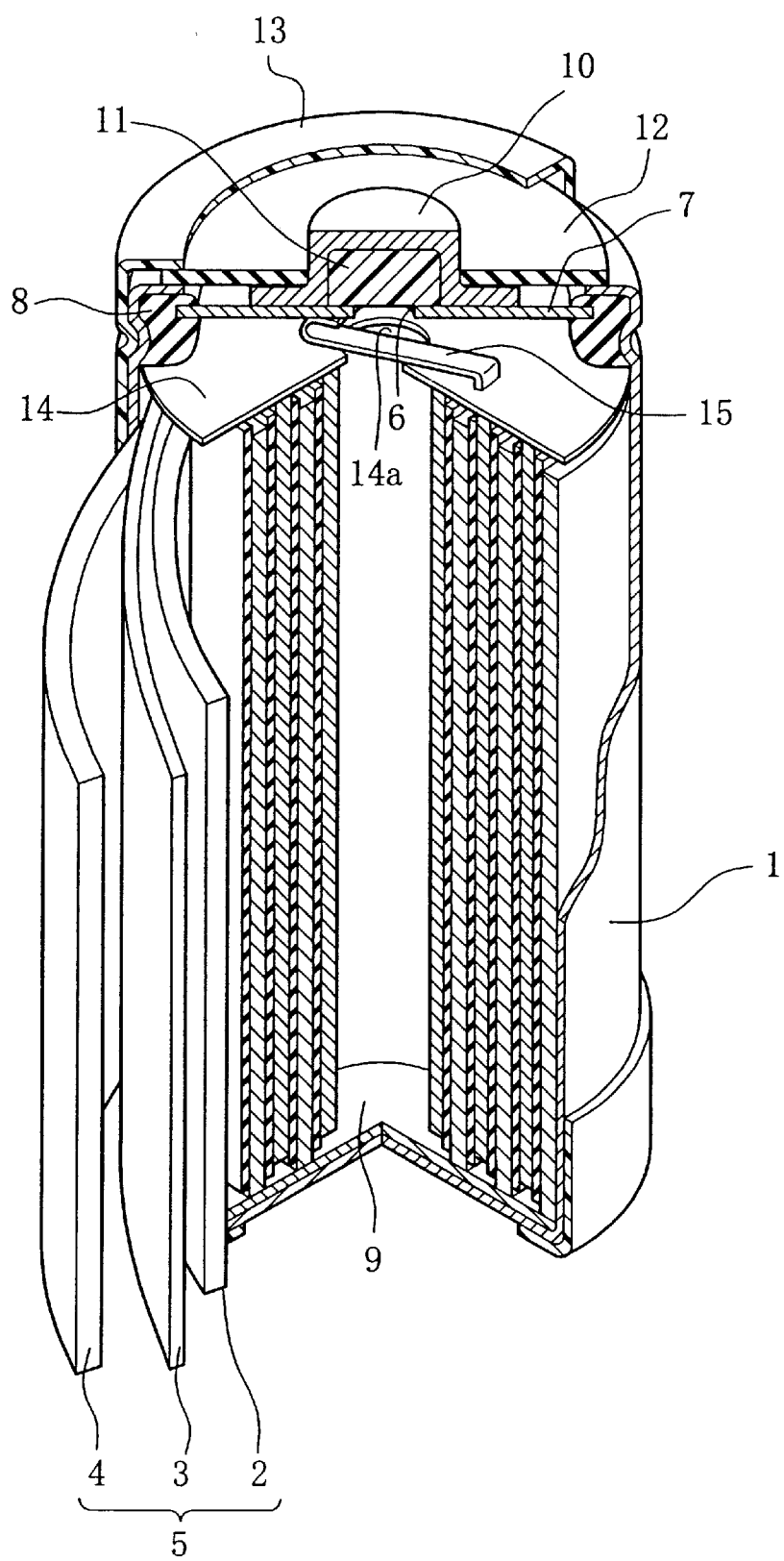

NICKEL-METAL HYDRIDE SECONDARY BATTERY

BACKGROUND OF THE INVENTION

1. Field of the Invention

The present invention relates to a nickel-metal hydride secondary battery. More particularly, the present invention is concerned with a nickel-metal hydride secondary battery which is advantageous not only in that it exhibits high charging efficiency in a high temperature environment and high capacity maintaining rate due to the excellent self-discharge characteristics thereof in a high temperature storage, high utilization of the active material for positive electrode, and further it can exhibit a large current discharge even at the initial stage of the discharge, but also in that it has excellent low-temperature charging characteristics.

2. Prior Art

In recent years, various electronic appliances, such as pocketable telephones and hand-held personal computers, have been developed in respect of being cordless, multi-functionality and compactness as well as weight reduction. In accordance with these developments, the demand for high capacity of a second battery which is a power source of the electronic appliance has greatly increased.

Conventionally, as the power sources of these electronic appliances, nickel-cadmium secondary batteries have been mainly used. However, in accordance with the above-mentioned great demand for high capacity, recently, a nickel-metal hydride secondary battery is beginning to be widely used because the nickel-metal hydride secondary battery is interchangeable with the voltage of the nickel-cadmium secondary battery and has a higher capacity than that of the nickel-cadmium secondary battery.

This nickel-metal hydride secondary battery generally comprises an electrode group comprising: a positive electrode comprising a current collector having carried thereon a mixture paste containing, as a main component, a nickel hydroxide powder which is an active material and a binder such as carboxymethyl cellulose; a negative electrode comprising a current collector having carried thereon a paste containing, as a main component, a powder of a hydrogen storage alloy and a binder such as carboxymethyl cellulose or polytetrafluoroethylene; and a separator comprising, for example, a polyamide fiber nonwoven fabric, having electrical insulating properties and a liquid retaining property, which separator is disposed between the positive electrode and the negative electrode, and has a structure such that this electrode group is accommodated in a battery casing which also serves as a negative electrode terminal, together with an alkali electrolyte liquid which is generally comprised mainly of an aqueous potassium hydroxide solution, and then, the battery casing is sealed up so that the electrode group and the alkali electrolyte liquid are sealed in the casing.

Then, an initial charge is conducted with respect to the assembled battery, so that nickel hydroxide as an active material for positive electrode is treated for activation. That is, this is a treatment such that nickel hydroxide which itself has no conductivity is converted into β-nickel oxyhydroxide being of trivalent and having a conductivity by subjecting to an initial charge for oxidation, making it possible to exhibit a function as an active material.

By the way, this nickel-metal hydride secondary battery is operated utilizing the characteristics of the hydrogen storage alloy such that it absorbs and desorbs hydrogen electrochemically and reversibly.

However, when this nickel-metal hydride secondary battery in a charging state is allowed to stand or stored in a high temperature environment, generally, the equilibrium pressure of the hydrogen storage alloy in the negative electrode increases, and thus, the amount of hydrogen which can be occluded in the negative electrode is reduced. Therefore, the hydrogen which cannot be stored any more in the negative electrode is emitted to the inside of the battery, so that the hydrogen partial pressure in the battery is increased. Then, this hydrogen passes through the separator to the positive electrode, and at the positive electrode, promotes the reduction of the nickel oxyhydroxide present in the positive electrode in a state of β-nickel oxyhydroxide which is an oxide product from nickel hydroxide by the above-mentioned initial charge. That is, the self-discharge of the nickel oxyhydroxide is promoted, and as a result, lowering of the discharge capacity occurs.

For solving such a problem, there has been proposed a method in which a vinyl monomer having a carboxyl group is subjected to graft polymerization on the surface of the separator comprising a fiber of a polyolefin resin (see Japanese Unexamined Patent Publication No. Hei 10-69898). By this method, the separator is provided with high hydrophilicity. Therefore, on the surface containing the spaces between the fiber constituting the separator, a film of an alkali electrolyte liquid is formed, and thus, this film prevents a diffusion of hydrogen into the positive electrode even when the hydrogen partial pressure within the battery is increased. As a result, the above-mentioned self-discharge of the positive electrode is suppressed.

However, recently, the use of the nickel-metal hydride secondary battery has been expanded in the application fields, such as an electric power tool, an electric vehicle and an electric power-assist bicycle, as a power source which requires a large current discharge. In view of the strong demand for the improvement of the self-discharge characteristics in the above application field, the method proposed in the above-mentioned prior art document has a problem in that a satisfactory improvement of the self-discharge characteristics cannot be achieved.

On the other hand, from the viewpoint of the charging problem of the nickel-metal hydride secondary battery, when the environment at the charging is a normal temperatures environment, the overpotential at the charging reaction of nickel hydroxide is larger than that required for the oxygen generation reaction from the alkali electrolyte liquid. Therefore, the charging reaction of nickel hydroxide first proceeds, and after almost completion of the charging reaction, the reaction is transferred to the oxygen generation reaction. Accordingly, in a normal temperatures environment, it is possible to advance the charging of the positive electrode surely and satisfactorily.

However, when the charging is conducted in a high temperature environment, the overpotential at the oxygen generation reaction is lowered. Therefore, the difference between the overpotential at the oxygen generation reaction and that at the charging reaction of nickel hydroxide becomes small. For this reason, from the relatively early stage of the charging, the competitive relationship between the charging reaction and the oxygen generation reaction occurs, causing a disadvantage that the charging reaction of nickel hydroxide does not satisfactorily proceed. That is, in a high temperature environment, problems arise in that the charging efficiency is lowered, and as a result, the discharge capacity of the battery is lowered.

For solving such problems, there have been proposed a method using, as an active material, nickel hydroxide having a cobalt component coprecipitated therein during the synthesis of the nickel hydroxide for lowering the equilibrium potential of the positive electrode (see Japanese Unexamined Patent Publication No. Sho 50-132441), and a method using nickel hydroxide having cadmium or the like coprecipitated therein for increasing the oxygen overpotential of the positive electrode (see Japanese Unexamined Patent Publication No. Sho 62-108458).

However, the positive electrodes produced by these methods do not exhibit a satisfactory level of charging efficiency in a high temperature environment.

In addition, in Japanese Unexamined Patent Publication No. Hei 5-28992, a positive electrode produced by adding to nickel hydroxide a compound of Y, In, Sb, Ba, Ca, Be or the like for increasing the oxygen overpotential is disclosed. However, in this positive electrode, due to the addition of the above-mentioned compound which does not participate in the charging and discharging reactions, the relative content of the nickel hydroxide functioning as an active material in the positive electrode becomes small. As a result, a problem of lowering of the discharge capacity arises.

Further, Japanese Unexamined Patent Publication No. Sho 47-20635 discloses a method using an alkali electrolyte liquid containing a tungstic acid ion for improving the charging efficiency in a high temperature environment.

However, in this method, for obtaining a satisfactory charging efficiency, it is necessary to use an alkali electrolyte liquid containing the tungstic acid ion in a higher content. In such a case, the viscosity of the alkali electrolyte liquid increases and the ion mobility is lowered, and as a result, the large current discharge characteristics disadvantageously become poor.

Further, Japanese Unexamined Patent Publication No. HEI 8-88020, Japanese Unexamined Patent Publication No. Hei 8-190931, Japanese Unexamined Patent Publication No. Hei 8-222213, Japanese Unexamined Patent Publication No. Hei 10-172558 and Japanese Unexamined Patent Publication No. Hei 10-24163 disclose nickel-metal hydride secondary batteries containing a tungstic acid ion or tungsten compound.

However, in those batteries, initial utilization of the active material and self-discharge characteristics in a high temperature environment are not satisfactory.

Further, in the charging of the nickel-metal hydride secondary battery, there involves the following disadvantages: since a large difference in current collection efficiency between the surface portion and the central portion of the nickel hydroxide as an active material is caused, when it is presumed that a full charging in a depth of 100% or more is conducted, the surface portion of the nickel hydroxide powder becomes in an overcharge state unavoidably. Therefore, the surface portion is excessively oxidized, and thus, γ-nickel oxyhydroxide being of trivalent or more is formed there.

However, this γ-nickel oxyhydroxide is inert, and has a low bulk density, as compared to trivalent β-nickel oxyhydroxide. Therefore, it is said that the γ-nickel oxyhydroxide has a cause for the lowering of the charging efficiency and the swelling of the positive electrode, as well as a cause for the lowering of the complete discharge capacity (memory effect) after the repetition of the shallow charging and discharging.

In order to suppress the formation of the above-mentioned γ-nickel oxyhydroxide, there has been proposed, for example, a method in which the surface of a nickel hydroxide powder is coated with an amorphous layer of a material comprised of nickel hydroxide and manganese hydroxide (see Japanese Unexamined Patent Publication No. Hei 10-106559). However, it is considered that this method poses a problem in that the manganese component which can be easily dissolved in the alkali electrolyte liquid in the battery penetrates into the inner portion of the nickel hydroxide powder, and the formation of the γ-nickel oxyhydroxide is rather promoted.

By the way, either in the above-mentioned initial charge or in the charge-discharge cycle process at an actual use, when the conductivity between the active materials for positive electrode and that between the active material for positive electrode and the current collector are high, the utilization of the active material for positive electrode becomes high, so that the reaction for battery smoothly proceeds. Therefore, from the viewpoint of realizing the theoretical capacity of the positive electrode, this is an important task.

For realizing such a task, measures have conventionally been taken as follows.

There is a method in which first, in the preparation of a paste for the positive electrode, a powder of a metallic cobalt or a powder of a cobalt compound, such as cobalt hydroxide, tricobalt tetroxide, dicobalt trioxide, cobalt monoxide or the like, or the mixture thereof is added in a predetermined amount as a conductive material, thereby producing a powder having a nickel hydroxide power mixed therein in a predetermined ratio, and this powder is used as an active material.

In the nickel-metal hydride secondary battery which has incorporated therein the positive electrode having the above-produced active material powder carried therein, any metallic cobalt or cobalt compound contained in the above powder is once dissolved in the alkali electrolyte liquid as complex ions and diffused between the nickel hydroxide powder, so that the complex ions are distributed on the surface of the powder. Then, in the initial charge for battery, these complex ions are oxidized prior to the oxidation of nickel hydroxide and converted into a higher order oxide of cobalt having a conductivity, and the oxide deposits between the nickel hydroxide powder as an active material and between the active material layer and the current collector, so that a conductive matrix is formed. As a result, the conductivity between the active materials and that between the active material and the current collector are enhanced, and hence, the utilization of the active material improves.

Therefore, in order to improve the utilization of the active material, it is considered effective to increase the content of metallic cobalt or a cobalt compound in the above-mentioned active material powder, and thereby increase the amount of the above-mentioned conductive matrix formed.

However, when such a method is employed, there are disadvantages not only in that the production cost for the positive electrode becomes high, but also in that as a whole of the battery, the relative content of the nickel hydroxide functioning as an active material for positive electrode becomes small, and thus, a high capacity battery cannot be obtained.

In view of this, it is preferred that an active material is in a state such that it can satisfactorily exhibit the effects thereof even though the content of the metallic cobalt or cobalt compound is minimized.

By the way, with respect to the improvement of the utilization of the active material, for example, Japanese Unexamined Patent Publication No. Hei 3-78965 discloses a method in which to an aqueous alkaline solution having a pH of 11 to 13 is added a powder comprised mainly of nickel hydroxide, and, for example, an aqueous solution of cobalt sulfate is added thereto, so that the surface of the above powder is coated with cobalt hydroxide (cobalt compound).

According to this method, it becomes possible to coat the surface of the nickel hydroxide powder with a small amount of a cobalt compound. However, on the other hand, there is a problem in that the amount of the above-mentioned conductive matrix formed is decreased, and the conductivity of the whole of the positive electrode does not become satisfactorily large.

Further, Japanese Unexamined Patent Publication No. Hei 9-213326 discloses a method in which a powder comprised mainly of nickel hydroxide is subjected to alkali heat treatment by performing a heat treatment in the coexistence of oxygen simultaneously with adding thereto both of an aqueous alkaline solution and a cobalt-containing aqueous solution, to thereby form, on the surface of the above powder, a layer of a higher order oxide of cobalt containing an alkali metal cation, such as $Na^+$.

It is disclosed that, according to this method, the obtained active material powder has an excellent conductivity and the utilization as an active material improves; however, as a matter of fact, there is a problem in that, at the early step of the above-mentioned alkali heat treatment in the coexistence of oxygen, before the surface of the powder comprised mainly of nickel hydroxide is coated with the cobalt compound, the cobalt compound disadvantageously undergoes oxidization, so that the contact between the cobalt compound and nickel hydroxide is decreased.

In view of above, the present inventors have employed a technique using an irradiation of a microwave from a magnetron as a heat treatment method for the formation of a conductive layer comprised of a higher order oxide of cobalt containing an alkali metal cation on the surface of the powder comprised mainly of nickel hydroxide, and have already filed this technique as Japanese Patent Application No. Hei 10-63142. By this method, a higher order oxide of cobalt having a conductivity can be efficiently formed while suppressing the air oxidization of the cobalt compound during the alkali heat treatment. Therefore, the utilization of the obtained powder as an active material becomes high.

However, as a result of the subsequent studies, it has been found that the nickel-metal hydride secondary battery having incorporated therein a positive electrode which contains, as an active material, the powder produced by the above-mentioned method poses a problem in that, in accordance with the progress of the charge-discharge cycle, the alkali metal cation contained in the conductive matrix comprised of the above-mentioned higher order oxide of cobalt is dissolved in the alkali electrolyte liquid, and as a result, the conductivity of the conductive matrix is lowered, leading to lowering of the utilization of the active material.

OBJECT AND SUMMARY OF THE INVENTION

It is an object of the present invention to solve the above-mentioned problems accompanying the conventional nickel-metal hydride secondary battery, and provide a nickel-metal hydride secondary battery which is advantageous not only in that it exhibits high utilization of the active material and excellent self-discharge characteristics in a high temperature environment, high charging efficiency in a high temperature environment, and further it can exhibit a large current discharge even at the initial stage of the discharge, but also in that it has excellent low-temperature charging characteristics.

For attaining the above objects, in the present invention, there is provided a nickel-metal hydride secondary battery (hereinafter, referred to as "battery I") comprising:

an electrode group comprising a positive electrode having carried thereon an active material powder containing a nickel hydroxide as a main component, a negative electrode having carried thereon a hydrogen storage alloy powder, and a separator being disposed between the positive electrode and the negative electrode, the electrode group being sealed in a battery casing, together with an alkali electrolyte liquid, wherein, in the battery, a W element and an Na element are present simultaneously.

Specifically, there is provided a nickel-metal hydride secondary battery wherein the W element and the Na element are respectively present as a tungstic acid ion and a sodium ion, and the relationship represented by the following formulae (1) and (2) is satisfied:

$$0.03 \leq x \leq 4 \quad (1)$$

$$1.5 \leq y \leq -14x+70 \quad (2)$$

wherein x represents a hundredfold value of the atomic ratio of the W element to the total alkali metal element present in the battery, and y represents a hundredfold value of the atomic ratio of the Na element to the total alkali metal element present in the battery.

Further, in the present invention, there is provided a nickel-metal hydride secondary battery (hereinafter, referred to as "battery II") comprising:

an electrode group comprising a positive electrode having carried thereon an active material powder containing a nickel hydroxide as a main component, a negative electrode having carried thereon a hydrogen storage alloy powder, and a separator being disposed between the positive electrode and the negative electrode, the electrode group being sealed in a battery casing, together with an alkali electrolyte liquid, wherein at least W element is present in the battery, and wherein a conductive coating layer comprised mainly of an Na-containing cobalt compound is formed on the surface of the active material powder, and a nickel-metal hydride secondary battery (hereinafter, referred to as "battery III") comprising:

an electrode group comprising a positive electrode having carried thereon an active material powder containing a nickel hydroxide as a main component, a negative electrode having carried thereon a hydrogen storage alloy powder, and a separator being disposed between the positive electrode and the negative electrode, the electrode group being sealed in a battery casing, together with an alkali electrolyte liquid, wherein at least W element is present in the battery, and wherein the separator comprises a sheet-form member having an acid group introduced into the surface thereof.

BRIEF DESCRIPTION OF THE DRAWING

FIGURE is a partial cross-sectional view showing one example of a nickel-metal hydride secondary battery of the present invention.

DETAILED DESCRIPTION OF THE PREFERRED EMBODIMENTS

First, an example of the structure of the battery of the present invention is shown in Figure, taking as an example the cylindrical nickel-metal hydride secondary battery for large current discharge. It should be noted that this structure example can be applied to any of battery I, battery II and battery III.

Here, battery I is a battery which is characterized in that a W element and an Na element are present in the battery simultaneously. Battery II is a battery wherein at least W element is present in the battery and the below-mentioned conductive coating layer comprised mainly of an Na-containing cobalt compound is formed on the surface of the active material for positive electrode. In this battery II, it is preferred that an Na element coexists in the battery.

Further, battery III is a battery wherein at least W element is present in the battery and, as a separator, the below-mentioned separator is used. Also in this battery III, it is preferred that an Na element coexists in the battery.

In the structure shown in Figure, in a closed-end cylindrical battery casing 1, an electrode group 5 comprising a spirally wound sheet in which a positive electrode 2, a separator 3 and a negative electrode 4 are stacked on one another is accommodated, together with an alkali electrolyte liquid (not shown).

The negative electrode 4 is arranged on the outermost of the electrode group, so that it is electrically contacted with the battery casing 1. The bottom portion of the electrode group 5 is welded, at the negative electrode 4 thereof, to a negative electrode current collector plate 9 arranged on the bottom of the battery casing. Further, the negative electrode current collector plate 9 is welded to the battery casing 1.

Then, an insulating gasket 8 in a ring form is arranged on the inner side of the upper opening of the battery casing 1, and a sealing plate 7 in a circular form having a pore 6 at the center thereof is arranged in a state such that the periphery portion of the sealing plate 7 is geared into the above insulating gasket 8. By caulking processing for diameter reduction of the upper opening of the above-mentioned battery casing 1 toward the inner side thereof, the sealing plate 7 air-tightly seals the upper opening of the battery casing 1 through the insulating gasket 8.

In addition, on the lower plane of the sealing plate 7, a positive electrode current collector plate 14 having a pore 14a at the center thereof is welded and arranged, and further, on this positive electrode current collector plate 14, the positive electrode 2 in the electrode group 5 is welded. A positive electrode lead plate 15 is welded to the positive electrode current collector plate 14, and the other end of this positive electrode lead plate 15 is welded to the sealing plate 7.

Then, a safety valve 11 made of a rubber is arranged so that it closes the central pore 6 of the sealing plate 7, and further, a cap-like positive electrode terminal 10 is welded to the sealing plate 7 so as to cover the safety valve 11, so that the electrode group is sealed in.

Further, on the upper portion of the battery casing having the above-mentioned structure, a press plate 12 which is made of an insulating material and has a central pore is arranged in a state such that only the above-mentioned positive electrode terminal 10 is penetrated through the above central pore, and an exterior tube 13 is arranged so as to cover the periphery portion of the press plate 12 and the side plane portion and bottom plane portion of the battery casing 1.

The form of the battery is not limited to the cylindrical form mentioned above and, for example, may be a rectangular battery having a structure such that a nickel electrode, a separator and a negative electrode are stacked on one another to form an electrode group in a rectangular parallelepiped form, and the electrode group is accommodated in a rectangular battery casing and the casing is sealed up.

Hereinbelow, the constituents of the nickel-metal hydride secondary battery of the present invention mentioned above will be successively explained, together with the effects thereof.

First, battery I is characterized in that, in the battery assembled, a W element and an Na element are present simultaneously. In addition, the above-mentioned W element and Na element are present, mainly, in the alkali electrolyte liquid as a tungstic acid ion and a sodium ion, respectively.

Examples of the alkali electrolyte liquid used include, for example, a mixed aqueous solution of an aqueous sodium hydroxide solution and an aqueous lithium hydroxide solution, a mixed aqueous solution of an aqueous potassium hydroxide solution and an aqueous lithium hydroxide solution, and a mixed aqueous solution of an aqueous potassium hydroxide solution, an aqueous lithium hydroxide solution and an aqueous sodium hydroxide solution.

In these alkali electrolyte liquids, the concentrations of the aqueous potassium hydroxide solution, the aqueous sodium hydroxide solution and the aqueous lithium hydroxide solution may be, respectively, 2.0 to 7.0 N, preferably 3.0 to 6.0 N; 1.0 to 6.0 N, preferably 2.0 to 5.0 N; and 0.3 to 2.0 N, preferably 0.5 to 1.5 N.

The above-mentioned W element can be present in the battery by, for example, dissolving a W compound, such as $WO_3$, $H_2WO_4$, $K_2WO_4$, $Na_2WO_4 \cdot 2H_2O$ or $Li_2WO_4$, in the alkali electrolyte liquid used in the assembling of the battery.

The tungstic acid ion which is the state of the existing W element is adsorbed onto the positive electrode to form an electrochemically stable film covering the active material powder. Then, this film functions as a barrier against hydrogen which is generated in the standing or storage in a high temperature environment and the charging, so that the reduction of nickel oxyhydroxide in the positive electrode is suppressed, thus improving the self-discharge characteristics of the active material.

On the other hand, the Na element can be present in the battery by adding sodium hydroxide to the alkali electrolyte liquid used in the assembling of the battery, or by preliminarily allowing the Na element to be carried on the positive electrode by adding sodium hydroxide to the alkali electrolyte liquid when the produced negative electrode is subjected to the below-mentioned alkali treatment. It is noted that also when as a binder, for example, sodium polyacrylate is used in the production of the positive and negative electrodes, or when, for example, $Na_2WO_4 \cdot 2H_2O$ is dissolved in the alkali electrolyte liquid, the Na element can be present in the battery as a sodium ion.

A part of the sodium ion, which is the state of the existing Na element, penetrates into the crystal lattice of the active material for positive electrode in the course of the charge-discharge cycle of the battery to strain the crystal lattice, so that the penetration of the above-mentioned tungstic acid ion into the inner portion of the active material or the formation of the above-mentioned barrier film is promoted, thus exhibiting an effect of more effectively suppressing the self-discharge of the active material.

As mentioned above, in battery I, by virtue of the effects synergistically exhibited by the tungstic acid ion and the sodium ion which are present in the battery simultaneously, the self-discharge of the active material can be effectively suppressed.

It is preferred that the amount of the W element present in the battery and the amount of the Na element present in the battery satisfy the relationship represented by the above formulae (1) and (2). In the present invention, the x value representing the above-mentioned amount of the W element and the y value representing the above-mentioned amount of the Na element are defined as the values measured in accordance with the following procedure. An explanation on this is made below.

(1) First, the amounts of the alkali metal elements (mainly, K, Na and Li) present in the battery are individually quantitatively determined.

Specifically, with respect to any of the battery assembled, the battery during the actual use, and the battery after the actual use, the battery is first disassembled to obtain separately the positive electrode, the negative electrode, the separator, and the other contents in the battery casing.

Then, the positive electrode and the negative electrode are dissolved in nitric acid, and the active material and the like adhering to the separator is also dissolved in nitric acid, followed by combination of these solutions, to thereby obtain a sample solution.

Subsequently, the obtained sample solution is subjected to atomic absorption spectrometry, to thereby quantitatively determine the individual alkali metals (K, Na and Li).

(2) Then, the y value representing the amount of the Na element can be determined by making calculation based on the following formula:

$$100 \times Na/(K+Na+Li).$$

(3) On the other hand, with respect to the W element, the x value is determined as follows.

First, after disassembling of the battery, the positive electrode and the negative electrode are dissolved in concentrated hydrochloric acid and the resultant solution is subjected to filtration. The resultant filtrate is subjected to inductively coupled plasma (ICP) emission spectrochemical analysis as such, to thereby quantitatively determine the W element. The residue obtained by the above filtration is incinerated, together with the filter paper, and then, subjected to alkali fusion and further dissolution in hydrochloric acid to give an aqueous solution, followed by the above ICP emission spectrochemical analysis. In addition, with respect to the separator, the same treatment is performed, followed by ICP emission spectrochemical analysis, to thereby quantitatively determine the W element.

Then, the value of the total W element amount quantitatively determined is divided by the quantitatively determined value of the alkali metal element obtained in (1) above, and the resultant value is multiplied by 100.

In the x and y values as defined above, it is preferred that the x value is 0.03 to 4.

When the x value is less than 0.03, the formation of the barrier film in an amount satisfactory for covering the surface of the active material powder does not proceed. On the other hand, when the x value is more than 4, the adsorption of the tungstic acid ions onto the active material powder proceeds excessively, and thus, the reaction resistance between the positive electrode and the alkali electrolyte liquid is increased and the increase in viscosity makes the ion mobility low, so that the positive electrode capacity at which discharge can be conducted becomes small, thus preventing the increase of the capacity. Preferred x value is 0.1 to 2.

On the other hand, it is preferred that the y value is selected so as to satisfy the relationship represented by the above formulae (1) and (2).

When the y value is less than 1.5, it becomes difficult to form the barrier film in an amount satisfactory for exhibiting the above-mentioned synergistic effect of the sodium ion and tungstic acid ion. On the other hand, when the y value is more than −14x+70, the penetration of the sodium ion into the active material proceeds excessively and the strain of the positive electrode becomes large, so that the formation of γ-nickel oxyhydroxide is promoted, leading to lowering of both the utilization of the active material and the high rate discharge characteristics.

It is more preferred that the x value and the y value satisfy the relationship represented by the following formulae (3) and (4):

$$0.1 \leq x \leq 2 \qquad (3)$$

$$3 \leq y < -14x+42 \qquad (4)$$

Next, the positive electrode 2 is described below.

The positive electrode 2 to be incorporated into the battery having the above-mentioned structure may be of either a sintering type or a paste type; however, the paste type is more effective for increasing the capacity of the battery because it is possible to support a large amount of the active material on the positive electrode.

This paste type positive electrode is produced by a method in which a conductive material and a binder are incorporated into a powder comprised mainly of a nickel hydroxide powder, and the resultant mixture is mixed with an arbitrary solvent, such as water, to obtain a paste, and then, the obtained paste is applied onto and fills a conductive substrate, followed by drying and press molding.

In the nickel hydroxide used as an active material, the value of a half width of the peak at (001) crystal face may be 0.8°/2θ(Cu-Kα) or more, especially preferably in the range of 0.9° to 1.1°/2θ(Cu-Kα), as measured by powdery X-ray diffraction analysis. This is because the charging efficiency of the battery assembled in a high temperature environment improves.

In addition, as the nickel hydroxide used, a eutectic of nickel hydroxide with one, or two or more of zinc, cobalt, bismuth and copper is preferred, and especially preferred is one containing zinc. This is because the charging efficiency improves, as compared to the case of the single nickel hydroxide.

When zinc is contained in nickel hydroxide, the lamellar structure of the nickel hydroxide is stabilized, so that the penetration of a large amount of the above-mentioned tungstic acid ion and sodium ion into the nickel hydroxide at the charging is prevented. In this case, it is preferred that the content of zinc in the nickel hydroxide is 3 to 10% by weight. When the zinc content is less than 3% by weight, the crystal structure of nickel hydroxide is not stabilized. On the other hand, when the zinc content is more than 10% by weight, the relative content of the nickel hydroxide in the positive electrode becomes small, so that the capacity of the positive electrode is lowered. The content of Zn is more preferably 4 to 7% by weight.

The nickel hydroxide containing zinc can be prepared by, for example, a method in which nickel sulfate and a sulfate of zinc are dissolved in diluted sulfuric acid, and the resultant solution is added dropwise to an aqueous alkaline solution, to thereby effect a coprecipitation of hydroxides of nickel and zinc.

Further, when the nickel hydroxide powder is too fine, even the central portion thereof becomes in the above-mentioned overcharge state at the charging, so that the entire powder is likely to be converted into γ-nickel oxyhydroxide.

On the other hand, when the nickel hydroxide powder is too coarse, the difference in current collection efficiency between the central portion and the surface portion of the nickel hydroxide powder becomes too large, and thus, the overcharge state of the surface portion is selectively advanced and γ-nickel oxyhydroxide is formed there, so that it is difficult to form a uniform β-nickel oxyhydoxide state. In any case, lowering in both the charging efficiency in a high temperature environment and capacity caused by the memory effects will be brought about.

For the above reasons, in the present invention, the active material powder comprised mainly of nickel hydroxide has preferably an average particle diameter of 3 to 20 μm, more preferably 8 to 14 μm.

Next, battery III will be described below specifically. In the active material powder used in the present invention, it is preferred that the surface of the powder comprised mainly of nickel hydroxide is coated with a conductive coating layer comprised mainly of an Na-containing cobalt compound. Specifically, this is the active material powder produced as follows. An explanation on this is made below.

First, as a starting material, there is provided a mixed powder of a powder comprised mainly of nickel hydroxide and a powder of a metallic cobalt or a cobalt compound, such as cobalt hydroxide, tricobalt tetraoxide, dicobalt trioxide, cobalt monoxide or a mixture thereof. Further, as a starting material, use can be made of a powder obtained by a method in which a powder comprised mainly of nickel hydroxide is added to an aqueous alkaline solution having a pH adjusted to from 11 to 13, and, for example, an aqueous solution of cobalt sulfate is gradually added thereto, so that the surface of the above powder is coated with a cobalt compound, such as cobalt hydroxide.

In such a starting material, it is preferred that the content of the metallic cobalt or cobalt compound in the above powder is selected in the range of from 0.5 to 20% by weight, based on the total weight of the powder. When the content is less than 0.5% by weight, the formation of the above-mentioned conductive matrix is unsatisfactory at the initial charge of the battery which has incorporated therein the positive electrode having carried thereon the obtained active material powder, so that the utilization of the active material does not become high. On the other hand, when the content is more than 20% by weight, the relative content of the nickel hydroxide powder in the active material becomes small, so that the discharge capacity of the battery is lowered. The content of the metallic cobalt or cobalt compound is preferably 1.0 to 12% by weight.

Then, the above-mentioned powder is placed in a vessel equipped with a stirrer to form a mixing and stirring system, and an aqueous alkaline solution is sprayed thereto or added thereto dropwise while stirring the powder, so that the content of the vessel is uniformly mixed, simultaneously with heating the mixing and stirring system in the coexistence with oxygen.

In this case, as the aqueous alkaline solution, an aqueous solution of sodium hydroxide is used, and further, a mixture obtained by mixing into the aqueous solution of sodium hydroxide an aqueous solution of potassium hydroxide and an aqueous solution of lithium hydroxide may be used.

During the mixing and stirring of the above-mentioned powder and aqueous alkaline solution, a part of the cobalt compound contained in the powder is dissolved in the aqueous alkaline solution as complex ions, and the complex ions are distributed between the powder in a state such that they covers the surface of the powder, so that a precursor of the above-mentioned conductive matrix is formed.

It should be noted that, in this process, although the reaction mechanism has not yet been elucidated, the sodium ions in the aqueous sodium hydroxide solution used are distributed on the surface of the powder in a state such that they are incorporated into the formed precursor of the conductive matrix.

In this case, it is preferred that the concentration of the aqueous alkaline solution is selected in the range of from 1 to 14 N. When the concentration is lower than 1 N, the metallic cobalt or cobalt compound contained in the powder is difficult to be dissolved in the aqueous alkaline solution, and thus, the formation of the above-mentioned precursor of the conductive matrix does not satisfactorily proceed, making it difficult to increase the utilization of the active material. On the other hand, the concentration is higher than 14 N, the viscosity of the above aqueous alkaline solution increases, and thus, it becomes difficult to satisfactorily wet the powder, so that the metallic cobalt or cobalt compound cannot be dissolved satisfactorily.

Then, by heating this mixing and stirring system in the coexistence of oxygen (specifically, for example, in the atmosphere), the oxidation of the above-mentioned precursor of the conductive matrix proceeds, thus forming a conductive coating layer comprising a higher order oxide of cobalt in a state such that it covers the surface of the powder and contains Na.

With respect to the method for heating, there is no particular limitation, for example, there can be mentioned a method of subjecting the mixing and stirring system to external heating, a method of allowing a heated air to directly blow the mixing and stirring system, and a method of subjecting the mixing and stirring system to irradiation of a microwave from a magnetron.

Among these heating methods, from the viewpoint of facilitating the improvement of the utilization of the active material, the microwave irradiation is advantageously employed.

Specifically, by using the microwave, the water molecules which incorporate therein and coexist with the above-mentioned powder are vibrated, so that the powder is uniformly heated. Therefore, the precursor of the conductive matrix formed on the surface of the powder is oxidized also in a state of being heated uniformly, and as a result, on the surface of the powder, as a conductive coating layer, a conductive matrix comprising a higher order oxide of cobalt is uniformly formed. In addition, it is considered that this microwave irradiation also has an effect for causing a defect in the crystal structure of the nickel hydroxide powder and changing the state of pores by the energy applied so as to increase the surface activity of the nickel hydroxide powder after the treatment.

The above-mentioned heat treatment using a microwave may be performed for the mixing and stirring system for about 10 minutes.

It is preferred that the temperature of the heat treatment for the mixing and stirring system is 35 to 160° C. When the temperature is lower than 35° C., the amount of the metallic cobalt or cobalt compound which is contained in the powder dissolved in the aqueous alkaline solution is lowered, and thus, the formation of the above-mentioned precursor of the conductive matrix is unsatisfactory, so that the utilization of the active material does not become high very much. On the other hand, when the temperature is higher than 160° C., the nickel hydroxide powder per se begins to suffer structural changing, so that the powder as an active material is deteriorated.

In the active material powder produced as mentioned above, the surface of the powder comprised mainly of nickel hydroxide is coated with a conductive coating layer comprising a higher order oxide of cobalt containing Na (conductive matrix). In this case, the Na contained in the above conductive matrix functions as a component contributing to the improvement of the conductivity of this conductive matrix, simultaneously with functioning as a component contributing to the suppression of the self-discharge of the active material in association with the above-mentioned alkali electrolyte liquid.

Further, it is preferred that the content of this Na is 0.05 to 5% by weight, based on the weight of the active material powder produced. When the Na content is less than 0.05% by weight, the effect for the improvement of the conductivity of the conductive coating layer formed is unsatisfactory, so that the utilization of the active material powder is lowered. On the other hand, when the Na content is more than 5% by weight, not only does the effect for the improvement of the conductivity of the conductive coating layer reach saturation, but also the preparation of the mixture paste for the positive electrode becomes difficult since the paste is strongly alkaline during the mixing of the mixture paste for the positive electrode with water, so that the positive electrode production is more difficult. Preferred Na content is selected in the range of 0.2 to 1% by weight, based on the weight of the active material powder produced.

Examples of binders used in the production of the positive electrode include, for example, carboxymethyl cellulose, methyl cellulose, sodium polyacrylate and polytetrafluoroethylene. Examples of current collectors to be filled with the paste include, for example, three-dimensional substrates, such as a foamed nickel substrate and a felt plated substrate which is obtained by subjecting a substrate or nonwoven fabric of a network sintered metal fiber to nickel plating; and two-dimensional substrates, such as a punched metal and an expanded metal.

Next, the separator with respect to battery III is described below.

There is no particular limitation on the separator, and those which have conventionally been used may be used as such, and, of these, preferred is a sheet-form member containing a polyolefin fiber and having an acid group introduced into the surface thereof.

Examples of polyolefin fibers include a polyolefin fiber itself including a polyethylene fiber and a polypropylene fiber as preferred examples; a conjugate fiber having a core/shell configuration wherein the surface of a certain polyolefin fiber is coated with a different polyolefin fiber; and a conjugate fiber having a dividing configuration wherein different types of polyolefin fibers are joined together in a circular form.

Further, as a form of the sheet-form member, there can be mentioned a nonwoven fabric and a woven fabric of the above-mentioned various polyolefin fibers, and a composite sheet obtained by the combination of the above nonwoven fabric and woven fabric. In addition, when the sheet-form member is a nonwoven fabric, the nonwoven fabric can be produced by, for example, a dry method, a wet method, a spunbond method and a melt-blow method.

In the polyolefin fiber constituting the sheet-form member, it is preferred that the average fiber diameter is 0.5 to 40 $\mu$m. When the average fiber diameter is smaller than 0.5 $\mu$m, the mechanical strength required for the separator is lowered, and, for example, the separator may be damaged during the production of an electrode group. On the other hand, when the average fiber diameter is larger than 40 $\mu$m, it becomes impossible to satisfactorily coat the surfaces of the positive electrode and the negative electrode which face to each other, causing that a short-circuiting between the positive and negative electrodes frequently occurs through the spaces between the fibers.

Further, when the thickness of the sheet-form member is too small, the strength becomes low and a short-circuiting between the positive and negative electrodes is likely to occur. On the other hand, when the thickness is too large, the volume ratio of the separator constituting the electrode group becomes large, leading to lowering of the capacity. Therefore, the thickness is preferably 0.1 to 0.3 mm, especially preferably 0.10 to 0.2 mm.

In addition, it is preferred that the unit weight of the sheet-form member is 30 to 80 g/m$^2$. When the unit weight is less than 30 g/m$^2$, the strength required for the separator tends to lower. On the other hand, when the unit weight is more than 80 g/m$^2$, the battery capacity tends to lower. Therefore, it is more preferred that the unit weight is selected in the range of 40 to 70 g/m$^2$.

With respect to the acid group introduced into the sheet-form member, there is no particular limitation as long as it has a high hydrophilicity. Specifically, preferred are a carboxylic group and a sulfonic group.

The acid group is introduced into the surface of the sheet-form member by introducing a substance containing the acid group into the surface of the fiber constituting the sheet-form member.

Examples of substances containing a carboxyl group include acrylic acid, methacrylic acid and esters thereof; substances having a functional group capable of directly reacting to an acid or a base to form a salt, such as vinyl pyridine, vinyl pyrrolidone, styrene sulfonic acid, and styrene; and substances having a functional group capable of graft-copolymerizing and then undergoing hydrolysis to form a salt.

For example, for introducing an acid group into a sheet-form member using acrylic acid, a sheet-form member is immersed in an aqueous solution of acrylic acid, and then removed. The sheet-form member is, for example, subjected to irradiation of ultraviolet rays, so that the acrylic acid monomer is graft-copolymerized on the fiber constituting the sheet-form member, thus introducing thereinto a carboxylic group as an acid group.

In addition, as a method for introducing a sulfonic group, there can be mentioned a method in which a sheet-form member is immersed in fuming sulfuric acid.

By using the above-mentioned separator, the following effects can be obtained.

Specifically, in the battery having incorporated therein the above separator, the acid group introduced into the surface of the separator is present in the state of an anion in the alkali electrolyte liquid, such as —COO$^-$. On the other hand, it is considered that a tungstic acid ion is also present in the state of an anion in the alkali electrolyte liquid.

Therefore, the tungstic acid ion in the alkali electrolyte liquid is inhibited from being adsorbed to the separator due to the repellency against the acid group on the surface of the separator. As a result, the tungstic acid ion is likely to present near the surface of the positive electrode in a high concentration, and thus, the oxygen generation overpotential on the surface of the positive electrode becomes high, so that the charging efficiency is improved even in a high temperature environment.

The amount of the acid group introduced which exhibits the above-mentioned effects can be represented by the potassium ion-exchange capacity (milli-equivalent per gramme: meq/g), and this amount is preferably 0.05 to 2.0 meq per 1 g of the separator.

When the potassium ion-exchange capacity is less than 0.05 meq/g, it becomes impossible to allow the tungstic acid ion in the alkali electrolyte liquid to be present near the surface of the positive electrode in a high concentration, so that the charging efficiency at a high temperature is not improved well. On the other hand, then the potassium ion-exchange capacity is more than 2 meq/g, the operation voltage disadvantageously becomes low when the large current discharge is conducted. Preferred potassium ion-exchange capacity is 0.1 to 1.8 meq/g.

The above-mentioned potassium ion-exchange capacity means the value obtained by the following titration method.

1) First, 0.5 to 1 g of a sample of the sheet-form member which has introduced thereinto an acid group is placed in a polyethylene wide-mouthed bottle having a capacity of 100 ml, and 100 ml of a 1N HCl solution is charged thereinto. If the sample floats, the sample is completely sent to the bottom, and maintained in a thermostat at 60° C. for 1 hour.

2) Then, the sample is transferred to a beaker containing 200 ml of ion-exchanged water, and the content of the beaker is stirred by a glass bar. The above sample is washed while exchanging the ion-exchanged water until the pH of the washing liquid becomes 6 to 7.

3) The sample is taken out and the water adhering to the sample is roughly removed, and then, the sample is spread on a tray made of stainless steel, followed by a drying treatment at 100° C. for 1 hour.

4) After cooling, the sample is weighed in the order of 0.1 mg, and then, transferred to a polyethylene wide-mouthed bottle having a capacity of 100 ml, followed by charging of 110±0.01 g of a 0.01 N KOH solution. The resultant solution is used as a test liquid.

5) Separately, 110±0.01 g of a 0.01 N aqueous KOH solution is charged into a polyethylene wide-mouthed bottle having a capacity of 100 ml, and this is used as a blank test liquid.

6) The above mentioned two wide-mouthed bottles are placed in a thermostat at 60° C., and maintained for 2 hours while lightly shaking every 30 minutes.

7) The two wide-mouthed bottles are removed, and allowed to stand for cooling to room temperature. Then, 100 g of the test liquid is weighed in the order of 0.01 g and placed in a conical beaker having a capacity of 200 ml, followed by a neutralization titration with a 0.1 N HCl solution using phenolphthalein as an indicator. The blank test liquid is also subjected to neutralization titration in the same manner as in the above test liquid.

8) Then, an I.E.C. (potassium ion-exchange capacity) value is determined by making calculation based on the following formula:

$$I.E.C. = \frac{T_2 \times (S_1/S_2 - T_1)}{W_1} \times \frac{E_1}{S_1} \times 0.1 \times F$$

Wherein:

I.E.C. is a potassium ion-exchange capacity (meq/g);

$T_1$ is an amount (ml) of the 0.1 N HCl solution required for the titration of the test liquid;

$T_2$ is an amount (ml) of the 0.1 N HCl solution required for the titration of the blank test liquid;

$S_1$ is a weight (g) of the test liquid weighed;

$S_2$ is a weight (g) of the blank test liquid weighed;

$E_1$ is a weight (g) of the 0.01 N KOH solution charged in the wide-mouthed bottle in item 5) above; and F is a factor of the 0.1 N HCl solution.

Next, the negative electrode is described below.

Negative electrode 4 is produced by a method in which a powder of a hydrogen storage alloy, a binder and, if desired, a conductive material such as graphite or carbon black, in predetermined amounts are mixed with water to prepare a paste, and the paste is applied onto and fills a conductive substrate, followed by drying and molding.

With respect to the hydrogen storage alloy used, there is no particular limitation, as long as it can have occluded therein hydrogen which is electrochemically generated in an alkali electrolyte liquid and easily desorb the occluded hydrogen when a discharge is conducted. For example, there can be mentioned a multiple element system metal alloy, such as $LaNi_5$, $MmNi_5$ (Mm means a Mischmetal), $LmNi_5$ (Lm means a Mischmetal having lanthanum enriched) or alloys obtained by substituting a part of Ni by Al, Mn, Co, Ti, Cu, Zn, Zr, Cr, B or like; a TiNi system metal alloy, a TiFe system metal alloy, a MgNi system metal alloy or the combination thereof; a metal alloy having a composition represented by LnNiwCoxMnyAlz (wherein Ln represents at least one selected from Y and rare earth elements, and w, x, y and z individually represents atomic ratios satisfying $5.00 \leq w+x+y+z \leq 5.50$); and a metal alloy which is represented by $AB_x$ (wherein A represents Ti or/and Zr; B represents Mn, or Mn and at least one selected from the group consisting of Ni, V, Co, Cr, Al, Fe, Cu, Mo, La, Ce, Pr and Nd; and x represents an atomic ratio satisfying $1.8 \leq x \leq 2.5$) and has a Laves phase of C14 or C15 as a main phase. Further, the hydrogen storage alloy represented by the formula: LmNixAlyAz (wherein Lm represents a Mischmetal having lanthanum enriched; A represents at least one selected from Al and Co; and x, y and z individually represents atomic ratios satisfying $4.8 \leq x+y+z \leq 5.4$) is preferred because the fine powder formation during the charge-discharge cycle is suppressed, and hence, it is possible to improve the cycle life property of the battery.

Further, the above powder of a hydrogen storage alloy is obtained by subjecting the hydrogen storage alloy having the above-mentioned composition to, for example, mechanical grinding or hydrogenation powderization.

In such a case, it is preferred that the alloy powder obtained has a specific surface area of 0.05 to 0.2 $m^2/g$.

Specifically, it is preferred that the alloy powder is powder (A) which is obtained by a method in which the ingot of the hydrogen storage alloy is subjected to hydrogenation powderization once under conditions wherein the temperature is 2 to 30° C. and the hydrogen pressure is 5 to 10 atom, and has a specific surface area of 0.05 to 0.2 $m^2/g$ as measured by a BET method, or powder (B) which is obtained by a method in which the ingot of the hydrogen storage alloy is subjected to hydrogenation powderization once under the above-mentioned conditions, to thereby obtain a ground ingot having a specific surface area of 0.05 to 0.2 $m^2/g$ as measured by a BET method, and the obtained ground ingot is further ground. In powder (B), the specific surface area may fall outside of the range of 0.05 to 0.2 $m^2/g$ as measured by a BET method.

The above-mentioned specific surface area is a factor of ensuring the area for the reaction of the hydrogen storage alloy with the alkali electrolyte liquid. The larger the specific surface area, the faster the electrode reaction. Therefore, a large current discharge can be achieved, and the low-temperature discharge characteristics are improved. However, when this specific surface area becomes too large, the corrosion of the hydrogen storage alloy caused by the alkali electrolyte liquid proceeds even if the composition of the alkali electrolyte liquid is specified, so that the amount of the alkali electrolyte liquid consumed increases, leading to shortening of the charge-discharge cycle life of the battery.

However, in the case of the battery of the present invention, an appropriate amount of a tungstic acid ion which exhibits the above-mentioned effects is contained in the alkali electrolyte liquid. Therefore, this tungstic acid ion covers the surface of the hydrogen storage alloy, so that the above-mentioned corrosion of the hydrogen storage alloy caused by the too large reaction area is suppressed.

By contrast, when the specific surface area is too small, the electrode reaction between the alloy and the alkali electrolyte liquid slows down the reaction speed thereof, so that it becomes difficult to improve the large current discharge characteristics and the low-temperature discharge characteristics.

Therefore, in the present invention, preferred specific surface area of the hydrogen storage alloy used is selected in the range of 0.05 to 0.2 $m^2/g$.

Further, the hydrogen storage alloy used is preferably subjected to the following surface treatment.

For example, there can be mentioned a surface treatment, such as plating with a metal including nickel or a metal oxide having a corrosion resistance, immersion to an alkali electrolyte liquid, a heat treatment, or a fluorine treatment. Such surface treatments may be conducted for either the alloy powder before producing the negative electrode or the produced negative electrode.

Especially when the hydrogen storage alloy contains a component which can be easily dissolved in the alkali electrolyte liquid, such as a Mn component, among the above surface treatments, it is preferred to employ the treatment of the immersion to an aqueous alkaline solution.

By this treatment of immersion to an aqueous alkaline solution, the component present on the surface of the hydrogen storage alloy, which can be easily dissolved in the alkali electrolyte liquid including a Mn component as a representative example, is preliminarily dissolved and removed, and thus, the surface activity of the hydrogen storage alloy is increased. Therefore, with respect to the battery which has incorporated therein the negative electrode having supported thereon the alloy powder which has been subjected to the above-mentioned treatment, when an initial charge or charging and discharging are conducted, the dissolution of the Mn component and the like in the alkali electrolyte liquid is suppressed, and thus, the conductivity and the reactivity between the positive electrode surface and the negative electrode surface are improved, so that effects of improving the large current discharge characteristics and the low-temperature discharge characteristics are obtained.

As the aqueous alkaline solution, for example, one, or two or more of an aqueous solution of sodium hydroxide, an aqueous solution of potassium hydroxide and an aqueous solution of lithium hydroxide can be used.

In this case, it is preferred that the concentration of the aqueous alkaline solution is 4N to 9N.

When this concentration is less than 4N, the Mn component and the like cannot be satisfactorily dissolved and removed at the immersion treatment, and thus, the dissolution of the Mn component and the like in the alkali electrolyte liquid in the assembled battery cannot be satisfactorily suppressed, so that the effects of improving the large current discharge characteristics and the low-temperature discharge characteristics are lowered. On the other hand, when the concentration is higher than 9N, the effects of dissolving and removing the Mn component and the like reach saturation, and therefore, such a high concentration is meaningless from the viewpoint of facilitating the improvement of the above characteristics. It is preferred that the concentration of the aqueous alkaline solution used is 6N to 8N.

As the binder used in the production of the negative electrode, there can be mentioned the above-mentioned polymer materials used in the production of positive electrode 2. As the current collector, there can be mentioned, for example, two-dimensional substrates, such as a punched metal, an expanded metal, a perforated steel plate and a nickel net; and substrates having a three-dimensional network structure, such a felt-like porous metal and a spongy metal substrate.

Between the above-described positive electrode and negative electrode is disposed the separator, to thereby produce an electrode group. The electrode group is accommodated in a battery casing, and the above-mentioned alkali electrolyte liquid is charged thereinto, and then, the battery casing is sealed up, to thereby assemble the nickel-metal hydride secondary battery of the present invention.

In this case, it is preferred that the amount of the alkali electrolyte liquid charged is selected in the range of 0.7 to 1.7 $cm^3/Ah$ relative to the theoretical capacity (unit: Ah) of the positive electrode incorporated.

The reason for this is as follows. The nickel-metal hydride secondary battery has a structure such that an electrode group and an alkali electrolyte liquid are accommodated in a battery casing having a determined volume. Therefore, the volume of the electrode group and the amount of the alkali electrolyte liquid are restricted by the volume of the battery casing. Further, when the amount of the alkali electrolyte liquid charged relative to the theoretical capacity of the positive electrode is higher than 1.7 $cm^3/Ah$, the volume of the electrode group accommodated cannot be satisfactorily increased due to the excess amount of the alkali electrolyte liquid charged, so that it is difficult to increase the capacity of the battery satisfactorily. For this reason, it is preferred that the charged amount is selected in the range of 1.7 $cm^3/Ah$ or less, and as a result, the increase of the battery capacity is achieved. However, when the charged amount is less than 0.7 $cm^3/Ah$, the amount of the alkali electrolyte liquid required for the electrode reaction is lack, so that the ion mobility in the positive electrode is lowered, leading to lowering of the utilization of the active material for positive electrode. Preferred amount of the alkali electrolyte liquid charged is 0.9 to 1.5 $cm^3/Ah$.

BEST MODE FOR CARRYING OUT THE INVENTION

Hereinbelow, the present invention will be described in more detail with reference to the following Examples and Comparative Examples, which should not be construed as limiting the scope of the present invention.

EXAMPLES 1 TO 41 AND COMPARATIVE EXAMPLES 1 TO 23

1. Preparation of Positive Electrode

Nickel sulfate, cobalt sulfate and zinc sulfate were dissolved in diluted sulfuric acid, and the pH of the resultant acidic solution was adjusted using an aqueous potassium hydroxide solution and an aqueous ammonia, to thereby prepare a precipitate of nickel hydroxide containing cobalt and zinc. This precipitate was separated by filtration and dried, to thereby obtain a nickel hydroxide powder having a particle diameter of 0.1 to 20 $\mu$m.

In this case, by changing the amount of the zinc sulfate dissolved, various nickel hydroxides having different zinc contents shown in Table 1 were prepared.

Then, into 100 parts by weight of the nickel hydroxide powder were incorporated 0.28 part by weight of carboxymethyl cellulose, 0.28 part by weight of sodium polyacrylate, 0.33 part by weight of polytetrafluoroethylene, and an appropriate amount of water, and the resultant mixture was thoroughly mixed, to thereby obtain a paste.

A nickel fiber substrate was filled with the obtained paste, followed by drying and press molding, to thereby produce a positive electrode.

In this instance, the amount of the filling paste was adjusted so that the capacity density of the positive electrode became 20 mAh/cm$^2$.

2. Preparation of Negative Electrode

A hydrogen storage alloy which has a composition: $LmNi_{0.4}Co_{0.4}Mn_{0.3}Al_{0.3}$ was subjected to mechanical grinding, to thereby obtain a 200 mesh-pass (Tyler mesh) powder.

Then, into 100 parts by weight of the obtained powder were incorporated 0.5 part by weight of sodium polyacrylate, 0.125 part by weight of carboxymethyl cellulose, 1.0 part by weight of carbon black, and 2.5 parts by weight of a PTFE dispersion (specific gravity: 1.5; solids content: 60 wt %), and the entire resultant mixture was mixed with 50 parts by weight of water, to thereby obtain a paste.

The obtained paste was applied to a nickel punched metal (opening ratio: 45%) and dried, followed by roll milling, to thereby produce an electrode of the hydrogen storage alloy (negative electrode).

3. Assembling of Battery

A nonwoven fabric mainly made of a core/shell configuration fiber, in which a core of a polypropylene fiber was covered with an ethylene vinyl alcohol copolymer, was used as a separator. This separator has an average fiber diameter of 10 μm and a unit weight of 60 g/m$^2$.

Separately, in a 1 N aqueous lithium hydroxide solution were dissolved potassium hydroxide and sodium hydroxide in various amount ratios, to thereby obtain mixed aqueous solutions. In these solutions were dissolved $Na_2WO_4 \cdot 2H_2O$ and $H_2WO_4$ in various amount ratios, to thereby prepare various alkali electrolyte liquids.

The separator was disposed between the above-mentioned positive electrode and negative electrode, and the whole of these materials was spirally wound, to thereby obtain an electrode group, and the electrode group was accommodated in a battery casing simultaneously with charging thereinto 2.8 ml of the alkali electrolyte liquid, followed by sealing up of the casing, to thereby assemble a nickel-metal hydride secondary battery (rated capacity: 1700 mAh) having a size of 4/5A and a structure shown in Figure.

4. Battery Characteristics

With respect to each of the obtained batteries, a 150% charging was conducted at room temperature at 0.1 C for 15 hours, and subsequently, a discharging was conducted at 0.2 C until the voltage of the battery became 1 V. Then, a 120% charging relative to the theoretical capacity was conducted again at room temperature at a current of 0.5 C, and then, a discharging was conducted at 0.5 C until the voltage of the battery became 1 V. This charge-discharge cycle was repeated in three times.

Then, with respect to the battery after the 3rd cycle, the discharge capacity was measured, and the measured value was divided by the rated capacity of the battery, to thereby determine an initial utilization (%). The results were shown in Tables 2 to 4.

Subsequently, a 120% charging was conducted at a temperature of 25° C. at 0.5 C, and the resultant battery was maintained as such in a thermostat at a temperature of 45° C. for 10 days. Then, a discharging was conducted again at a temperature of 25° C. at 0.5 C until the voltage of the battery became 1 V, and the discharge capacity was measured and the measured value was divided by the above rated capacity of the battery, to thereby determine a capacity maintaining ratio (%), so that the self-discharge characteristics in a high temperature storage was examined. The results were also shown in Tables 2 to 4.

In addition, batteries were assembled in substantially the same manner as in the above Examples except that $Na_2MoO_4 \cdot 2H_2O$ was used instead of $Na_2WO_4 \cdot 2H_2O$ and $H_2WO_4$, and the characteristics were shown in Tables 2 to 4 as Comparative Examples 19 to 21.

5. Measurements of x Value and y Value

First, as shown in Table 1, three types of standard solutions having different K concentrations, Na concentrations and Li concentrations were prepared.

TABLE 1

|  | K concentration (ppm) | Na concentration (ppm) | Li concentration (ppm) |
|---|---|---|---|
| Standard solution 1 | 0.5 | 1.0 | 2.0 |
| Standard solution 2 | 0.5 | 1.0 | 2.0 |
| Standard solution 3 | 0.2 | 0.4 | 0.8 |

Using an atomic absorption spectrometry apparatus, manufactured and sold by Hitachi Ltd. (machine type: Z5310, polarized Zeeman atomic absorption spectrometer), with respect to each of the above three standard solutions, K, Na and Li were individually quantitatively determined to prepare a calibration curve.

In the above quantitative determinations, the measurement wavelengths used for K, Na and Li were 766.5 nm, 589.0 nm and 670.8 nm, respectively.

Separately, each of the batteries which have been subjected to the measurements of the battery characteristics mentioned in item 4 above was dismounted, so that the positive electrode, the negative electrode and the separator were removed. The positive electrode and negative electrode were dissolved in about 60% nitric acid, and the separator was also treated with about 60% nitric acid so that the substances adhering thereto were dissolved, followed by combination of these solutions, to thereby obtain a sample solution.

With respect to each of the obtained sample solutions, using the above-mentioned apparatus, K, Na and Li were quantitatively determined under the same conditions.

From the obtained values, a calculation was made on 100×Na/(K+Na+Li), and the resultant values were shown in Tables 2 to 4 as y values. The x value was measured as follows.

First, three types of standard solutions having $WO_4^{2-}$ concentrations of 5 ppm, 10 ppm and 20 ppm in terms of the W amount were prepared. Then, using an inductively coupled plasma (ICP) emission spectrochemical analysis apparatus, manufactured and sold by Seiko Electronics Inc. (machine type: SPS1500VR), with respect to each of the above three standard solutions, W was quantitatively determined to prepare a calibration curve. In the above quantitative determinations, the measurement wavelength used was 209.86 nm.

Then, each of the batteries which have been subjected to the measurements of the battery characteristics was dismounted, so that the positive electrode, the negative electrode and the separator were removed. The positive electrode and negative electrode were dissolved in 35% by weight concentrated hydrochloric acid, and then, the resultant solution was subjected to filtration. The resultant filtrate was subjected to ICP emission spectrochemical analysis as such using the above-mentioned ICP emission spectrochemical analysis apparatus under the same conditions, so that W was quantitatively determined using the above-prepared calibration curve. The determined value is referred to as $w_1$ (ppm).

On the other hand, the residue obtained by the above filtration was incinerated, together with the filter paper, and the resultant ash was subjected to alkali fusion using 10 parts by weight of sodium carbonate and 20 parts by weight of boric acid into a glass form, and further added thereto water, concentrated hydrochloric acid (35% by weight) and 10% tartaric acid, to thereby effect a complete fusion. Then, the resultant solution was subjected to ICP emission spectrochemical analysis using the above-mentioned ICP emission spectrochemical analysis apparatus under the same conditions, and W was quantitatively determined using the calibration curve. The determined value is referred to as $w_2$ (ppm).

Further, also with respect to the separator, the same incineration and alkali fusion were conducted, and then, W was quantitatively determined by performing ICP emission spectrochemical analysis. The determined value is referred to as $w_3$ (ppm).

Then, calculations were made based on the formula: $(w_1+w_2+w_3)\times 100/(K+Na+Li)$. The obtained values were shown in Tables 2 to 4 as x values.

TABLE 2

|  | Zn content of nickel | W and Na in battery | | Battery characterictics | |
| --- | --- | --- | --- | --- | --- |
|  | hydroxide (% by weight) | W element (x value) | Na element (y value) | Initial utiliza- tion (%) | Capacity maintaing rate (%) |
| Example 1 | 5.0 | 0.03 | 1.5 | 101 | 70 |
| Example 2 | 5.0 | 1.0 | 1.5 | 101 | 75 |
| Example 3 | 5.0 | 2.0 | 1.5 | 100 | 75 |
| Example 4 | 5.0 | 4.0 | 1.5 | 96 | 73 |
| Example 5 | 5.0 | 0.03 | 3.0 | 101 | 73 |
| Example 6 | 5.0 | 0.1 | 3.0 | 101 | 80 |
| Example 7 | 5.0 | 0.5 | 3.0 | 102 | 82 |
| Example 8 | 5.0 | 1.0 | 3.0 | 102 | 83 |
| Example 9 | 5.0 | 2.0 | 3.0 | 100 | 80 |
| Example 10 | 5.0 | 2.2 | 3.0 | 98 | 80 |
| Example 11 | 5.0 | 0.03 | 10.0 | 101 | 74 |
| Example 12 | 5.0 | 0.1 | 10.0 | 101 | 81 |
| Example 13 | 5.0 | 0.5 | 10.0 | 102 | 83 |
| Example 14 | 5.0 | 1.0 | 10.0 | 102 | 84 |
| Example 15 | 5.0 | 2.0 | 10.0 | 100 | 81 |
| Example 16 | 5.0 | 2.2 | 10.0 | 98 | 80 |
| Example 17 | 5.0 | 0.03 | 14.0 | 101 | 73 |
| Example 18 | 5.0 | 0.1 | 14.0 | 101 | 80 |
| Example 19 | 5.0 | 0.5 | 14.0 | 101 | 82 |
| Example 20 | 5.0 | 1.0 | 14.0 | 102 | 83 |
| Example 21 | 5.0 | 2.0 | 14.0 | 101 | 80 |
| Example 22 | 5.0 | 2.2 | 14.0 | 98 | 80 |
| Example 23 | 5.0 | 4.0 | 14.0 | 96 | 78 |
| Example 24 | 5.0 | 0.03 | 28.0 | 100 | 72 |
| Example 25 | 5.0 | 0.1 | 28.0 | 100 | 79 |

TABLE 3

|  | Zn content of nickel | W and Na in battery | | Battery characteristics | |
| --- | --- | --- | --- | --- | --- |
|  | hydroxide (% by weight) | W element (x value) | Na element (y value) | Initial utiliza- tion (%) | Capacity maintaining rate (%) |
| Example 26 | 5.0 | 0.5 | 28.0 | 101 | 81 |
| Example 27 | 5.0 | 1.0 | 28.0 | 100 | 80 |
| Example 28 | 5.0 | 1.2 | 28.0 | 98 | 80 |
| Example 29 | 5.0 | 3.0 | 28.0 | 96 | 78 |
| Example 30 | 5.0 | 0.1 | 40.6 | 100 | 78 |
| Example 31 | 5.0 | 0.03 | 42.0 | 99 | 72 |
| Example 32 | 5.0 | 0.5 | 42.0 | 98 | 74 |
| Example 33 | 5.0 | 1.5 | 42.0 | 97 | 74 |
| Example 34 | 5.0 | 2.0 | 42.0 | 96 | 73 |
| Example 35 | 5.0 | 0.1 | 44.0 | 98 | 73 |
| Example 36 | 5.0 | 0.03 | 56.0 | 98 | 71 |
| Example 37 | 5.0 | 0.5 | 56.0 | 97 | 72 |
| Example 38 | 5.0 | 1.0 | 56.0 | 96 | 73 |
| Example 39 | 5.0 | 0.03 | 69.0 | 96 | 70 |
| Example 40 | 3.0 | 1.0 | 10.0 | 100 | 82 |
| Example 41 | 10.0 | 1.0 | 10.0 | 99 | 81 |
| Comparative Example 1 | 5.0 | — | — | 101 | 52 |
| Comparative Example 2 | 5.0 | 1.0 | — | 101 | 60 |
| Comparative Example 3 | 5.0 | 4.0 | — | 92 | 59 |
| Comparative Example 4 | 5.0 | 0.03 | 1.0 | 101 | 58 |
| Comparative Example 5 | 5.0 | 1.0 | 1.0 | 101 | 68 |
| Comparative Example 6 | 5.0 | 4.0 | 1.0 | 93 | 67 |
| Comparative Example 7 | 5.0 | 0.02 | 1.5 | 101 | 58 |

TABLE 4

|  | Zn content of nickel | W and Na in battery | | Battery characteristics | |
| --- | --- | --- | --- | --- | --- |
|  | hydroxide (% by weight) | W element (x value) | Na element (y value) | Initial utiliza- tion (%) | Capacity maintaining rate (%) |
| Comparative Example 8 | 5.0 | 4.2 | 1.5 | 92 | 70 |
| Comparative Example 9 | 5.0 | — | 14.0 | 101 | 54 |
| Comparative Example 10 | 5.0 | 0.02 | 14.0 | 101 | 63 |
| Comparative Example 11 | 5.0 | 4.2 | 14.0 | 92 | 71 |
| Comparative Example 12 | 5.0 | — | 42.0 | 99 | 56 |
| Comparative Example 13 | 5.0 | 0.02 | 42.0 | 99 | 60 |
| Comparative Example 14 | 5.0 | 2.2 | 42.0 | 92 | 70 |
| Comparative Example 15 | 5.0 | 0.02 | 56.0 | 98 | 60 |
| Comparative Example 16 | 5.0 | 1.2 | 56.0 | 92 | 70 |
| Comparative Example 17 | 5.0 | — | 75.0 | 91 | 53 |
| Comparative Example 18 | 5.0 | 0.1 | 75.0 | 92 | 70 |
| Comparative Example 19 | 2.5 | 1.0 | 10.0 | 94 | 66 |
| Comparative Example 20 | 10.5 | 1.0 | 10.0 | 93 | 65 |
| Comparative Example 21 | 5.0 | 0.03* | 10.0 | 101 | 59 |

TABLE 4-continued

| | Zn content of nickel hydroxide (% by weight) | W and Na in battery | | Battery characteristics | |
|---|---|---|---|---|---|
| | | W element (x value) | Na element (y value) | Initial utilization (%) | Capacity maintaining rate (%) |
| Comparative Example 22 | 5.0 | 1.0* | 10.0 | 100 | 62 |
| Comparative Example 23 | 5.0 | 4.0* | 10.0 | 95 | 60 |

*: In terms of Mo amount

From Tables 2 to 4, the following has been found.
1. First, as is apparent from the comparison between Example 20 and Comparative Examples 2 and 9, with respect to the initial utilization, there is no large difference; however, in both of Comparative Example 9 wherein only an Na element is present in the battery and Comparative Example 2 wherein only a W element is present in the battery, the capacity maintaining ratio in a high temperature storage is markedly lowered and thus, the self-discharge characteristics become poor, as compared to those in Examples.

Therefore, the fact that, in the battery, an Na element and a W element are present simultaneously is extremely effective for improving the self-discharge characteristics in a high temperature storage.

2. In addition, as is apparent from each of Examples, the larger the amounts of the Na element and W element, the more excellent the self-discharge characteristics in a high temperature storage. However, when the x value is smaller than 0.03 or more than 4, or when the y value is smaller than 1.5 or more than −14x+70 in connection with the relationship between the x value and y value, the initial utilization becomes low.

From the above, it is advantageous that the Na element and the W element are present in the battery simultaneously so that the x value falls within the range of 0.03 to 4 and the y value is 1.5 or more and satisfies the relationship of −14x+70.

3. When the zinc content of nickel hydroxide is less than 3% by weight, both of the initial utilization and the self-discharge characteristics in a high temperature storage tend to lower. On the other hand, when the zinc content is more than 10% by weight, lowering of the initial utilization due to the lowering of the battery capacity is recognized.

From the above, it is preferred that the zinc content of nickel hydroxide is 3 to 10% by weight.

4. Further, also when $Na_2MoO_4 \cdot 2H_2O$ was dissolved instead of $Na_2WO_4 \cdot 2H_2O$ and $H_2WO_4$ as in Comparative Examples 21 to 23, an improvement of the self-discharge characteristics in a high temperature storage is recognized; however, the effect for this improvement is small, as compared to that in the case where $Na_2WO_4 \cdot 2H_2O$ and $H_2WO_4$ was dissolved. Further, a synergetic effect with the sodium ion is not recognized.

EXAMPLES 42 TO 91 AND COMPARATIVE EXAMPLES 24 TO 39

Battery III was produced as follows.

First, in a mixed system of 6.5 N KOH and 1 N LiOH was dissolved $H_2WO_4$, to thereby prepare various alkali electrolyte liquids.

Separately, a nonwoven fabric made of a polypropylene fiber (average fiber diameter: 8 μm) which was produced by spunbond method and has a unit weight of 60 g/m² and a thickness of 0.20 mm was provided.

Then, this nonwoven fabric was immersed in an aqueous solution of acrylic acid and then removed. The surface of the nonwoven fabric was subjected to irradiation of ultraviolet rays, to thereby effect a graft-polymerization of an acrylic acid monomer. Then, the fabric was washed with water so as to remove the unreacted acrylic acid. In this case, by changing the concentration of the aqueous acrylic acid solution, and the irradiation strength and irradiation time of ultraviolet rays, the amounts of the acrylic acid monomer introduced were changed so that the resultant separators have the potassium ion-exchanged capacity values on the surface thereof shown in Table 5. These separators are referred to as separator I.

In addition, the above-mentioned nonwoven fabric was immersed in fuming sulfuric acid and removed, and then washed with water, to thereby effect a sulfonation treatment. In this case, by changing the immersion time, the amounts of the sulfonic group introduced were changed so that the resultant separators have the potassium ion-exchanged capacity values shown in Tables 6 and 7. These separators are referred to as separator II.

Using these separators, and the positive electrode having a zinc content of 5% by weight and the negative electrode used in Example 1, an electrode group was produced, and the electrode group was accommodated in a battery casing, together with the above-mentioned alkali electrolyte liquid, to thereby assemble a battery shown in FIGURE.

With respect to each of the obtained batteries, the high temperature charging efficiency and the large current discharge ratio were measured as follows.

(1) High Temperature Charging Efficiency

A charging was conducted at a temperature of 25° C. at 0.1 C for 15 hours, and subsequently, a discharging was conducted at a temperature of 25° C. at 0.2 C until the voltage of the battery became 1 V. In this instance, a discharge capacity ($C_0$) was measured. Then, a charging was conducted at a temperature of 50° C. at 0.1 C for 15 hours, and subsequently, the temperature was lowered to 25° C., and after the battery temperature was confirmed to be consistent with the ambient atmosphere temperature, a discharging was conducted at 0.2 C until the voltage of the battery became 1 V. In this instance, a discharge capacity (CM) was measured. Then, a calculation was made on the formula: $C_M \times 100/C_0$, to thereby determine a value of the high temperature charging efficiency (%).

(2) Large Current Discharge Ratio

A charging was conducted at a temperature of 25° C. at 0.1 C for 15 hours, and subsequently, a discharging was conducted at a temperature of 25° C. at 0.2 C until the voltage of the battery became 1 V. In this instance, a discharge capacity ($C_0$) was measured. Then, a charging was conducted at a temperature of 25° C. at 0.1 C for 15 hours, and subsequently, a discharging was conducted at a temperature of 25° C. at 2 C until the voltage of the battery became 1 V. In this instance, a discharge capacity ($C_1$) was measured. Then, a calculation was made on the formula: $C_1 \times 100/C_0$, to thereby determine a value of the large current discharge ratio (%).

Then, with respect to each of the batteries which have been subjected to the measurements of the battery characteristics, the amount of the W element (x value) present in the battery was measured in the same manner as Examples 1 to 41.

The results in the case using separator I are shown in Table 5, and those in the case using separator II are shown Tables 6 and 7.

TABLE 5

| | Pottassium ion-exchange capacity of separator I (meg/g) | W element (x value) | Battery characteristics | |
|---|---|---|---|---|
| | | | High temperature charging efficiency (%) | Large current discharge rate (%) |
| Example 42 | 0.05 | 0.03 | 68 | 100 |
| Example 43 | 0.1 | 0.03 | 69 | 100 |
| Example 44 | 1.0 | 0.03 | 72 | 100 |
| Example 45 | 1.8 | 0.03 | 73 | 100 |
| Example 46 | 2.0 | 0.03 | 76 | 100 |
| Example 47 | 0.05 | 0.1 | 70 | 100 |
| Example 48 | 0.1 | 0.1 | 73 | 100 |
| Example 49 | 1.0 | 0.1 | 75 | 100 |
| Example 50 | 1.8 | 0.1 | 77 | 100 |
| Example 51 | 2.0 | 0.1 | 80 | 100 |
| Example 52 | 0.05 | 1.0 | 73 | 100 |
| Example 53 | 0.1 | 1.0 | 76 | 100 |
| Example 54 | 1.0 | 1.0 | 78 | 100 |
| Example 55 | 1.8 | 1.0 | 80 | 100 |
| Example 56 | 2.0 | 1.0 | 82 | 98 |
| Example 57 | 0.05 | 2.0 | 75 | 98 |
| Example 58 | 0.1 | 2.0 | 78 | 98 |
| Example 59 | 1.0 | 2.0 | 79 | 97 |
| Example 60 | 1.8 | 2.0 | 80 | 97 |
| Example 61 | 2.0 | 2.0 | 82 | 96 |
| Example 62 | 0.05 | 4.0 | 76 | 97 |
| Example 63 | 0.1 | 4.0 | 79 | 96 |
| Example 64 | 1.0 | 4.0 | 80 | 95 |
| Example 65 | 1.8 | 4.0 | 81 | 94 |
| Example 66 | 2.0 | 4.0 | 83 | 93 |
| Comparative Example 24 | 0.05 | 0.02 | 49 | 100 |
| Comparative Example 25 | 2.0 | 0.02 | 55 | 100 |
| Comparative Example 26 | 0.03 | 0.03 | 54 | 100 |
| Comparative Example 27 | 4.0 | 0.03 | 56 | 70 |
| Comparative Example 28 | 0.03 | 4.0 | 55 | 92 |
| Comparative Example 29 | 4.0 | 4.0 | 84 | 67 |
| Comparative Example 30 | 0.05 | 4.5 | 56 | 78 |
| Comparative Example 31 | 2.0 | 4.5 | 84 | 70 |

TABLE 6

| | Pottassium ion-exchange capacity of separator II (meg/g) | W element (x value) | Battery characteristics | |
|---|---|---|---|---|
| | | | High temperature charging efficiency (%) | Large current discharge rate (%) |
| Example 67 | 0.05 | 0.03 | 70 | 100 |
| Example 68 | 0.1 | 0.03 | 71 | 100 |
| Example 69 | 1.0 | 0.03 | 72 | 100 |
| Example 70 | 1.8 | 0.03 | 74 | 100 |
| Example 71 | 2.0 | 0.03 | 77 | 100 |
| Example 72 | 0.05 | 0.1 | 72 | 100 |
| Example 73 | 0.1 | 0.1 | 73 | 100 |
| Example 74 | 1.0 | 0.1 | 76 | 100 |
| Example 75 | 1.8 | 0.1 | 77 | 100 |
| Example 76 | 2.0 | 0.1 | 81 | 100 |
| Example 77 | 0.05 | 1.0 | 74 | 100 |
| Example 78 | 0.1 | 1.0 | 77 | 100 |
| Example 79 | 1.0 | 1.0 | 78 | 100 |
| Example 80 | 1.8 | 1.0 | 80 | 100 |
| Example 81 | 2.0 | 1.0 | 83 | 98 |
| Example 82 | 0.05 | 2.0 | 76 | 98 |
| Example 83 | 0.1 | 2.0 | 78 | 98 |

TABLE 7

| | Pottassium ion-exchange capacity of separator II (meg/g) | W element (x value) | Battery characteristics | |
|---|---|---|---|---|
| | | | High temperature charging efficiency (%) | Large current discharge rate (%) |
| Example 84 | 1.0 | 2.0 | 79 | 97 |
| Example 85 | 1.8 | 2.0 | 81 | 97 |
| Example 86 | 2.0 | 2.0 | 83 | 97 |
| Example 87 | 0.05 | 4.0 | 78 | 97 |
| Example 88 | 0.1 | 4.0 | 79 | 96 |
| Example 89 | 1.0 | 4.0 | 81 | 95 |
| Example 90 | 1.8 | 4.0 | 82 | 94 |
| Example 91 | 2.0 | 4.0 | 83 | 92 |
| Comparative Example 32 | 0.05 | 0.02 | 50 | 100 |
| Comparative Example 33 | 2.0 | 0.02 | 56 | 100 |
| Comparative Example 34 | 0.03 | 0.03 | 54 | 100 |
| Comparative Example 35 | 4.0 | 0.03 | 56 | 70 |
| Comparative Example 36 | 0.03 | 4.0 | 55 | 91 |
| Comparative Example 37 | 4.0 | 4.0 | 85 | 64 |
| Comparative Example 38 | 0.05 | 4.5 | 56 | 75 |
| Comparative Example 39 | 2.0 | 4.5 | 84 | 69 |

From Tables 5 to 7, the following is apparent.

(1) First, it is presumed that the ion-exchange capacities of the surface of the separators are the same. When the x value which represents the amount of the W element present in the battery is less than 0.03, the amount of the tungstic acid ion near the surface of the positive electrode is reduced, and thus, the high temperature charging efficiency becomes low. On the other hand, when the x value is more than 4, the viscosity of the electrolyte liquid is increased, and thus, the large current discharge characteristics become poor. From the above, it is preferred that the x value for the W element in the battery is selected in the range of 0.03 to 4.

(2) In each of Examples, irrespective of the type of the acid group, when the potassium ion-exchange capacity of the surface of the separator is smaller than 0.05 meq/g, the high temperature charging efficiency becomes small. On the other hand, when the potassium ion-exchange capacity is larger than 2.0 meq/g, lowering of the large current discharge ratio due to the lowering of the operation voltage of the battery is recognized. From the above, it is preferred that the potassium ion-exchange capacity on the surface of the separator is selected in the range of 0.05 to 2.0 meq/g.

EXAMPLES 92 TO 99

Battery III was produced as follows.

In 1 N LiOH were dissolved KOH and NaOH so that the total alkali concentration of the resultant solution became 8 N, to thereby prepare a mixed aqueous solution, and in the mixed aqueous solution were $Na_2WO_4 \cdot 2H_2O$ and $H_2WO_4$ in various amount ratios, to thereby prepare various alkali electrolyte liquids.

Then, using the positive electrode and the negative electrode used in Example 1, between these electrodes was disposed the separator shown in Table 8, to thereby produce an electrode group. And the electrode group was accommodated in a battery casing together with 2.8 ml of the above-mentioned alkali electrolyte liquid, to thereby assemble a battery shown in FIGURE.

With respect to each of the obtained batteries, the initial utilization and the self-discharge characteristics were measured in the same manner as in Examples 1 to 41, and the high temperature charging efficiency and the large current discharge ratio were measured in the same manner as in Examples 42 to 91.

Then, each battery was dismounted, and the x value and the y value in connection with the W element and Na element in the battery were individually determined in the same manner as in Example 1.

The results were summarized and shown in Table 8.

TABLE 8

|  | Na content of active material powder (% by weight) | W element in battery (x value) | Separator | | Battery characteristics | | | |
|---|---|---|---|---|---|---|---|---|
|  |  |  | Type of acid group | Pottassium ion-exchange capacity (meq/g) | Initial utiliza- tion (%) | Capacity maintain- ing rate (%) | High temperature charging efficiency (%) | Large current discharge rate (%) |
| Example 92 | 1.5 | 2.0 | Carboxyl group | 1.0 | 100 | 75 | 83 | 98 |
| Example 93 | 10.0 | 1.0 | Carboxyl group | 1.0 | 102 | 87 | 82 | 100 |
| Example 94 | 1.5 | 2.0 | Carboxyl group | 0.1 | 100 | 74 | 81 | 98 |
| Example 95 | 10.0 | 1.0 | Carboxyl group | 0.1 | 102 | 86 | 79 | 100 |
| Example 96 | 1.5 | 2.0 | Sulfonic group | 1.0 | 100 | 76 | 81 | 97 |
| Example 97 | 10.0 | 1.0 | Sulfonic group | 1.0 | 102 | 88 | 80 | 100 |
| Example 98 | 1.5 | 2.0 | Sulfonic group | 0.1 | 100 | 75 | 80 | 98 |
| Example 99 | 10.0 | 1.0 | Sulfonic group | 0.1 | 102 | 88 | 79 | 100 |

As apparent from Table 8, battery III is a battery which exhibits not only excellent self-discharge characteristics in a high temperature storage as well as excellent high temperature charging efficiency, but also excellent large current discharge ratio.

EXAMPLES 100 TO 107 AND COMPARATIVE EXAMPLES 40 TO 46

Battery II was produced as follows.
1. Preparation of Positive Electrode

Nickel sulfate, cobalt sulfate and zinc sulfate were dissolved in diluted sulfuric acid, and the pH of the resultant solution was adjusted using an aqueous solution of potassium hydroxide and an aqueous ammonia, to thereby prepare a precipitate of nickel hydroxide containing cobalt and zinc. This precipitate was separated by filtration and dried, to thereby obtain a nickel hydroxide powder containing Zn and Co and having an average particle diameter of 10 $\mu$m.

Using a mixing and stirring apparatus, to 100 parts by weight of the above-obtained powder was added 5 parts by weight of a cobalt monoxide powder having an average particle diameter of 1 $\mu$m, and 1 to 14 N aqueous sodium hydroxide solutions were individually sprayed thereto while mixing, simultaneously with an irradiation of a microwave from a magnetron operated with 4 kW, to thereby effect a heat treatment at about 100° C. for 10 minutes on the above mixing and stirring system. After completion of the heat treatment, the treated powder was removed and washed with water, to thereby obtain various active material powders.

In this case, by changing the concentration of the aqueous sodium hydroxide solution used and the frequency of the water washing, the Na contents of the treated powders were selected in the values shown in Table 9.

Next, into 100 parts by weight of each active material powder were incorporated 0.28 part by weight of carboxymethyl cellulose, 0.28 part by weight of sodium polyacrylate, 0.33 part by weight of polytetrafluoroethylene, and an appropriate amount of water, and the resultant mixture was thoroughly mixed, to thereby obtain a paste.

Nickel-plated porous substrates each having a porosity of 95% and a thickness of 1.7 mm were individually filled with the above-obtained pastes, followed by drying and press molding, to thereby produce various positive electrodes.

In this instance, the amount of the filling paste was adjusted so that the capacity density of the positive electrode became 20 mAh/cm$^2$.

2. Preparation of Negative Electrode

A hydrogen storage alloy having a composition: $LmNi_{0.4}Co_{0.4}Mn_{0.3}Al_{0.3}$ was subjected to mechanical grinding, to thereby obtain a 200 mesh-pass (Tyler mesh) powder.

Then, into 100 parts by weight of the obtained powder were incorporated 0.5 part by weight of sodium polyacrylate, 0.125 part by weight of carboxymethyl cellulose, 1.0 part by weight of carbon black, and 2.5 parts by weight of a PTFE dispersion (specific gravity: 1.5; solids content: 60 wt %), and the entire resultant mixture was mixed with 50 parts by weight of water, to thereby obtain a paste.

The obtained paste was applied to a nickel punched metal (opening ratio: 45%) and dried, followed by roll milling, to thereby produce an electrode of the hydrogen storage alloy (negative electrode).

3. Assembling of Battery

First, in a mixed aqueous solution of 1 N aqueous lithium hydroxide solution and 7 N aqueous potassium hydroxide solution were dissolved $Na_2WO_4 \cdot 2H_2O$ and $H_2WO_4$ in various amount ratios, to thereby prepare various alkali electrolyte liquids.

A separator obtained by graft-polymerizing acrylic acid on a nonwoven fabric mainly made of a polypropylene fiber was disposed between the above-mentioned positive electrode and negative electrode, and the whole of these materials was spirally wound, to thereby obtain an electrode group. The electrode group was accommodated in a battery casing simultaneously with charging thereinto 2.8 ml of the above-mentioned alkali electrolyte liquid, followed by sealing up of the casing, to thereby assemble a nickel-metal hydride secondary battery having a size of 4/5A and a structure shown in FIGURE.

4. Battery Characteristics

With respect to each of the obtained batteries, a 150% charging was conducted at room temperature at 0.1 C for 15 hours, and subsequently, a discharging was conducted at 0.2 C until the voltage of the battery became 1 V. Then, a 120% charging relative to the theoretical capacity was conducted again at room temperature at a current of 1 C, and then, a discharging was conducted at 1 C until the voltage of the battery became 1 V. This charge-discharge cycle was repeated.

Then, with respect to each of the battery after the 1st cycle and the battery after the 300th cycle, the discharge capacity was measured, and the utilization of the active material and the capacity maintaining ratio were determined by calculation in accordance with the following formulae:

Utilization (%)=(Discharge capacity measured/Theoretical capacity of active material)×100

Capacity maintaining ratio (%)=(Discharge capacity measured/Discharge capacity after the 1st cycle)×100.

Then, each battery was dismounted, and the amount of the W element (x value) present in the battery was measured in the same manner as in Example 1.

The results were summarized and shown in Table 9.

TABLE 9

| | Na content of active material powder (% by weight) | W element in battery (x value) | 1st cycle Utilization of active material (%) | 300th cycle Utilization of active material (%) | 300th cycle Capacity maintaining rate (%) |
|---|---|---|---|---|---|
| Example 100 | 0.05 | 0.03 | 97 | 90 | 93 |
| Example 101 | 5.0 | 0.03 | 98 | 91 | 93 |
| Example 102 | 0.5 | 1.0 | 100 | 95 | 95 |
| Example 103 | 3.0 | 1.0 | 98 | 93 | 95 |
| Example 104 | 0.5 | 2.0 | 100 | 94 | 94 |
| Example 105 | 3.0 | 2.0 | 98 | 92 | 94 |
| Example 106 | 0.05 | 4.0 | 96 | 89 | 93 |
| Example 107 | 5.0 | 4.0 | 97 | 90 | 93 |
| Comparative Example 40 | 0.03 | 0.02 | 91 | 76 | 84 |
| Comparative Example 41 | 5.1 | 0.02 | 92 | 77 | 84 |
| Comparative Example 42 | 0.03 | 4.5 | 89 | 74 | 83 |
| Comparative Example 43 | 5.1 | 4.5 | 90 | 75 | 83 |
| Comparative Example 44 | 0.5 | — | 100 | 75 | 75 |
| Comparative Example 45 | 0 (untreated) | — | 90 | 65 | 72 |
| Comparative Example 46 | 0 (untreated) | 1.0 | 90 | 70 | 79 |

EXAMPLES 108 TO 115 AND COMPARATIVE EXAMPLES 47 TO 53

Active material powders were prepared in substantially the same procedure as in Examples 100 to 107 except that the amount of the cobalt monoxide added was changed to 0.5 part by weight, and batteries were assembled in the same manner. With respect to these batteries, the characteristics and the x values are shown in Table 10.

TABLE 10

| | Na content of active material powder (% by weight) | W element in battery (x value) | 1st cycle Utilization of active material (%) | 300th cycle Utilization of active material (%) | 300th cycle Capacity maintaining rate (%) |
|---|---|---|---|---|---|
| Example 108 | 0.05 | 0.03 | 94 | 85 | 90 |
| Example 109 | 5.0 | 0.03 | 95 | 86 | 91 |
| Example 110 | 0.5 | 1.0 | 97 | 90 | 93 |
| Example 111 | 3.0 | 1.0 | 95 | 88 | 93 |
| Example 112 | 0.5 | 2.0 | 97 | 89 | 92 |
| Example 113 | 3.0 | 2.0 | 95 | 87 | 92 |
| Example 114 | 0.05 | 4.0 | 93 | 84 | 90 |
| Example 115 | 5.0 | 4.0 | 94 | 85 | 90 |
| Comparative Example 47 | 0.03 | 0.02 | 86 | 69 | 80 |
| Comparative Example 48 | 5.1 | 0.02 | 87 | 70 | 80 |
| Comparative Example 49 | 0.03 | 4.5 | 84 | 67 | 80 |
| Comparative Example 50 | 5.1 | 4.5 | 85 | 68 | 80 |
| Comparative Example 51 | 0.5 | — | 97 | 65 | 67 |
| Comparative Example 52 | 0 (untreated) | — | 78 | 58 | 74 |
| Comparative Example 53 | 0 (untreated) | 1.0 | 78 | 62 | 78 |

EXAMPLES 116 TO 123 AND COMPARATIVE EXAMPLES 54 TO 60

Active material powders were prepared in substantially the same procedure as in Examples 100 to 107 except that the amount of the cobalt monoxide added was changed to 20 part by weight, and batteries were assembled in the same manner. With respect to these batteries, the characteristics and the x values are shown in Table 11.

TABLE 11

| | Na content of active material powder (% by weight) | W element in battery (x value) | 1st cycle Utilization of active material (%) | 300th cycle Utilization of active material (%) | 300th cycle Capacity maintaining rate (%) |
|---|---|---|---|---|---|
| Example 116 | 0.05 | 0.03 | 92 | 84 | 91 |
| Example 117 | 5.0 | 0.03 | 93 | 85 | 91 |
| Example 118 | 0.5 | 1.0 | 95 | 89 | 94 |
| Example 119 | 3.0 | 1.0 | 93 | 87 | 94 |
| Example 120 | 0.5 | 2.0 | 95 | 88 | 93 |
| Example 121 | 3.0 | 2.0 | 93 | 86 | 92 |
| Example 122 | 0.05 | 4.0 | 91 | 83 | 91 |
| Example 123 | 5.0 | 4.0 | 92 | 84 | 91 |
| Comparative Example 54 | 0.03 | 0.02 | 85 | 68 | 80 |
| Comparative Example 55 | 5.1 | 0.02 | 86 | 69 | 80 |
| Comparative Example 56 | 0.03 | 4.5 | 83 | 66 | 80 |
| Comparative Example 57 | 5.1 | 4.5 | 84 | 67 | 80 |
| Comparative Example 58 | 0.5 | — | 96 | 64 | 67 |
| Comparative Example 59 | 0 (untreated) | — | 77 | 57 | 74 |
| Comparative Example 60 | 0 (untreated) | 1 | 77 | 59 | 78 |

EXAMPLES 124 AND 125

Active material powders were prepared in substantially the same procedure as in Example 102 except that the amount of the cobalt monoxide added was changed to 0.3 part by weight and 21 parts by weight, respectively, and batteries were assembled in the same manner. With respect to these batteries, the characteristics and the x values are shown in Table 12.

TABLE 12

|  | Amount of cobalt monoxide added to active material powder (part by weight) | Na content of active material powder (% by weight) | W element in battery (x value) | 1st cycle Utilization of active material (%) | 300th cycle Utilization of active material (%) | 300th cycle Capacity maintaining rate (%) |
| --- | --- | --- | --- | --- | --- | --- |
| Example 124 | 0.3 | 0.5 | 1.0 | 87 | 78 | 90 |
| Example 125 | 21 | 0.5 | 1.0 | 85 | 77 | 91 |

From Tables 9 to 12, the following is apparent.
(1) A comparison is made between Examples wherein Na is contained in the active material powder and a tungstic acid ion is contained in the electrolyte liquid and Comparative Examples which do not satisfy the above requirement. In each of the above Examples, the utilization of the active material is maintained at a high level even in accordance with the progress of the charge-discharge cycle, and the capacity maintaining ratio is also maintained at a high level. That is, the present invention is apparently advantageous.
(2) However, as apparent from the comparison between, for example, a group of Examples 100 to 107 and a group of Comparative Examples 40 to 46 shown in Table 9, when the Na content of the active material powder falls outside of the range of 0.05 to 5% by weight, or when the x value for the W element in the battery falls outside of the range of 0.03 to 4, both of the utilization of the active material and the capacity maintaining ratio become low. This tendency can also be seen in Tables 10, 11 and 12. From the above, it is preferred that the Na content of the active material powder is selected in the range of 0.05 to 5% by weight and the x value for the W element in the battery is selected in the range of 0.03 to 4.
(3) In all of Example 102 (see Table 9), Example 110 (see Table 10), Example 118 (see Table 11), and Examples 124 and 125 shown in Table 12, the Na contents of the active material powder and the x values for the W element in the battery are the same, but the amounts of cobalt monoxide added in the production of the active material powder are different to each other.

As is apparent from the comparison between these Examples, when the amount of cobalt monoxide added is 0.3 part by weight (Example 124) or 21 parts by weight (Example 125), lowering of the utilization of the active material and lowering of the capacity maintaining ratio are recognized.

From the above, it is preferred that the amount of cobalt monoxide added is selected in the range of 0.5 to 20% by weight.

EXAMPLES 126 TO 139 AND COMPARATIVE EXAMPLE 61

1. Preparation of Positive Electrode

Nickel hydroxide powders having the values of half width of the peak at (101) crystal face as measured by powdery X-ray diffraction analysis shown in Table 13 were provided.

Into 90 parts by weight of the above powder were incorporated 5.0 parts by weight of a cobalt hydroxide powder in terms of the cobalt amount (in the cases of Examples 126 to 133, Examples 135 to 139 and Comparative Example 61) or 5.0 parts by weight of a cobalt monoxide powder in terms of the cobalt amount (in the case of Example 134), 0.25 part by weight of carboxymethyl cellulose, 0.25 part by weight of sodium polyacrylate, 3.0 parts by weight of polytetrafluoroethylene, and water, and the resultant mixture was thoroughly mixed, to thereby obtain a paste.

A nickel fiber substrate was filled with the obtained paste, followed by drying and press molding, to thereby produce a positive electrode.

2. Preparation of Negative Electrode

A hydrogen storage alloy having a composition: $LmNi_{0.4}Co_{0.4}Mn_{0.3}Al_{0.3}$ was treated by a high-frequency furnace into an ingot, and the ingot was subjected to hydrogenation powderization once under conditions wherein the temperature was 2 to 30° C. and the hydrogen pressure was 5 to 10 atom, to thereby obtain five types of alloy ingot powders having specific surface areas, as measured by a BET method, of 0.02 $m^2/g$ (alloy powder 1), 0.05 $m^2/g$ (alloy powder 2), 0.10 $m^2/g$ (alloy powder 3), 0.15 $m^2/g$ (alloy powder 4) and 0.23 $m^2/g$ (alloy powder 5). Further, these powders were subjected to mechanical grinding, to thereby obtain alloy powders.

The specific surface area was measured by Quantasorb QS-20 (trade name), manufactured and sold by Quantachrome.

Then, into 100 parts by weight of the obtained powder were incorporated 0.5 part by weight of sodium polyacrylate, 0.125 part by weight of carboxymethyl cellulose, 1.0 part by weight of carbon black, and 1.5 parts by weight of a polytetrafluoroethylene dispersion (specific gravity: 1.5; solids content: 60 wt %), and the entire resultant mixture was mixed with 50 parts by weight of water, to thereby obtain a paste.

The obtained pastes were individually applied to a nickel punched metal (opening ratio: 45%) and dried, followed by roll milling, to thereby produce five types electrodes of the hydrogen storage alloy (negative electrodes).

3. Assembling of Battery

A hydrophilicity-treated nonwoven fabric made of a polyolefin was disposed between the above-mentioned each positive electrode and each negative electrode, and the whole of these materials was spirally wound, to thereby obtain an electrode group. Then, the electrode group was accommodated in a battery casing.

Prior to the above electrode group production, each of the negative electrodes used in Examples 129 to 134, Examples 137 to 139 and Comparative Example 61 was subjected to immersion treatment in a heated aqueous solution of sodium hydroxide having a concentration of 30% by weight at a temperature of 80° C. for 1 hour.

Then, in a 1N aqueous lithium hydroxide solution were dissolved potassium hydroxide and sodium hydroxide, to thereby obtain an aqueous alkaline solution having a total alkali concentration of 8N, and in the obtained aqueous alkaline solution were $Na_2WO_4 \cdot 2H_2O$ and $H_2WO_4$ in various amount ratios, to thereby prepare various alkali electrolyte liquids. Each of the prepared alkali electrolyte liquids (temperature: 25° C.) was charged so that the capacity became 1.3 cm³/Ah relative to the theoretical capacity of the positive electrode, to thereby assemble a cylindrical nickel-metal hydride secondary battery (size: 4/5A; rated capacity: 1,700 mAh) having a structure shown in FIGURE.

discharge capacity ($C_0$) was measured. Then, a charging was conducted at a temperature of 50° C. at 0.1 C for 15 hours, and subsequently, the temperature was lowered to 25° C., and after the battery temperature was confirmed to be consistent with the environmental temperature, a discharging was conducted at 0.2 C until the voltage of the battery became 1 V. In this instance, a discharge capacity (CM) was measured. Then, a calculation was made on the formula: $C_M \times 100/C_0$, to thereby determine a value of the high temperature charging efficiency (%).

(4) A charging was conducted at a temperature of 25° C. at 0.1 C for 15 hours, and subsequently, a discharging was

TABLE 13

| | Positive electrode | Negative electrode | | | |
|---|---|---|---|---|---|
| | Value of half width of nickel hydroxide (°/2θ) | Cobalt compound used | Metal alloy powder | | Immersion treatment in aqueous alkaline solution | W element in battery (x) |
| | | | Type | Specific surface area (m²/g) | | |
| Example 126 | 1.0 | Cobalt hydroxide | Alloy powder 2 | 0.05 | no | 1.0 |
| Example 127 | 1.0 | Cobalt hydroxide | Alloy powder 3 | 0.10 | no | 1.0 |
| Example 128 | 1.0 | Cobalt hydroxide | Alloy powder 4 | 0.15 | no | 1.0 |
| Example 129 | 1.0 | Cobalt hydroxide | Alloy powder 4 | 0.15 | yes | 1.0 |
| Example 130 | 1.0 | Cobalt hydroxide | Alloy powder 4 | 0.15 | yes | 0.03 |
| Example 131 | 1.0 | Cobalt hydroxide | Alloy powder 4 | 0.15 | yes | 0.5 |
| Example 132 | 1.0 | Cobalt hydroxide | Alloy powder 4 | 0.15 | yes | 2.0 |
| Example 133 | 1.0 | Cobalt hydroxide | Alloy powder 4 | 0.15 | yes | 4.0 |
| Example 134 | 1.0 | Cobalt monoxide | Alloy powder 4 | 0.15 | yes | 1.0 |
| Example 135 | 1.0 | Cobalt hydroxide | Alloy powder 1 | 0.02 | no | 1.0 |
| Example 136 | 1.0 | Cobalt hydroxide | Alloy powder 5 | 0.23 | no | 1.0 |
| Example 137 | 1.0 | Cobalt hydroxide | Alloy powder 4 | 0.15 | yes | 0.02 |
| Example 138 | 1.0 | Cobalt hydroxide | Alloy powder 4 | 0.15 | yes | 4.5 |
| Example 139 | 0.75 | Cobalt hydroxide | Alloy powder 4 | 0.15 | yes | 1.0 |
| Comparative Example 61 | 1.0 | Cobalt hydroxide | Alloy powder 4 | 0.15 | yes | — |

4. Battery Characteristics

First, a 150% charging was conducted at room temperature at 0.1 C for 15 hours, and subsequently, a discharging was conducted at 0.2 C until the voltage of the battery became 1 V. This charge-discharge cycle was repeated three times, to thereby effect an activation treatment. Then, the battery characteristics were examined as follows.

(1) A charging was conducted at room temperature at 0.1 C for 15 hours, and subsequently, a discharging was conducted at 1 C until the voltage of the battery became 1 V. This charge-discharge cycle was repeated in three cycles, and with respect to the battery after the 3rd cycle, the discharge capacity was measured. The measured value was divided by the theoretical capacity of the positive electrode, to thereby determine an initial utilization (%) of the active material.

(2) A 120% charging was conducted at a temperature of 25° C. at 0.5 C, and the resultant battery was maintained as such in a thermostat at a temperature of 45° C. for 10 days. Then, a discharging was conducted again at a temperature of 25° C. at 0.5 C until the voltage of the battery became 1 V, and the discharge capacity was measured. The measured value was divided by the above rated capacity, to thereby determine a capacity maintaining ratio (%), so that the self-discharge characteristics in a high temperature storage were examined. The results were also shown in Table 14.

(3) A charging was conducted at a temperature of 25° C. at 0.1 C for 15 hours, and subsequently, a discharging was conducted at a temperature of 25° C. at 0.2 C until the voltage of the battery became 1 V. In this instance, a discharge capacity ($C_0$) was measured. Then, a charging was conducted again at a temperature of 25° C. at 0.1 C for 15 hours, and subsequently, a discharging was conducted at a temperature of 25° C. at 2 C until the voltage of the battery became 1 V. In this instance, a discharge capacity ($C_1$) was measured. Then, a calculation was made on the formula: $C_1 \times 100/C_0$, to thereby determine a value of the large current discharge ratio (%).

(5) A 120% charging was conducted at room temperature at 1 C, and subsequently, a discharging was conducted until the voltage of the battery became 1 V. This charge-discharge cycle was repeated until the discharge capacity became 80% of the initial capacity. The cycle frequency at this point in time was determined.

Then, each battery was dismounted, and the amount of the W element present in the battery was measured in the same manner as in Example 1.

The results were summarized and shown in Table 14.

TABLE 14

| | Initial utilization of active material (%) | Capacity maintaining rate at high temperature (45° C.) (%) | High temperature charging efficiency (%) | Large current discharge rate (%) | Cycle frequency (cycle) |
|---|---|---|---|---|---|
| Example 126 | 97 | 71 | 73 | 81 | 580 |
| Example 127 | 97 | 70 | 74 | 90 | 570 |
| Example 128 | 99 | 71 | 74 | 95 | 530 |
| Example 129 | 101 | 70 | 77 | 100 | 500 |
| Example 130 | 100 | 63 | 74 | 100 | 450 |
| Example 131 | 100 | 70 | 76 | 100 | 490 |
| Example 132 | 100 | 75 | 80 | 91 | 530 |
| Example 133 | 99 | 75 | 83 | 82 | 550 |
| Example 134 | 100 | 68 | 69 | 95 | 400 |
| Example 135 | 96 | 71 | 72 | 70 | 600 |
| Example 136 | 100 | 70 | 76 | 100 | 330 |
| Example 137 | 100 | 57 | 54 | 100 | 400 |
| Example 138 | 98 | 76 | 85 | 73 | 560 |
| Example 139 | 88 | 67 | 69 | 77 | 430 |
| Comparative Example 61 | 99 | 55 | 52 | 100 | 380 |

From Tables 13 and 14, the following is apparent.
(1) A comparison is made between Examples 126 to 136. When the specific surface area of the alloy powder in the negative electrode is 0.05 to 0.2 m$^2$/g (Examples 126 to 134), the obtained battery exhibits excellent large current discharge characteristics and excellent charge-discharge cycle life characteristics.

When the specific surface area is small (Example 135), the cycle life characteristics are excellent; however, the large current discharge characteristics become poor. By contrast, when the specific surface area is more than 0.2 m$^2$/g (Example 136), the large current discharge characteristics are improved, but marked lowering of the cycle life characteristics is recognized.

(2) As is apparent from the comparison between Example 128 and Example 129, even in the case of the same the specific surface area of the hydrogen storage alloy powder in the negative electrode, when the negative electrode is subjected to surface treatment by an aqueous alkaline solution, the large current discharge characteristics are improved.

(3) A comparison is made between Examples 129 to 133 and Examples 137 and 138. The batteries wherein the x value for the W element in the battery is 0.03 to 4 (Examples 129 to 133) are excellent in respect of all the capacity maintaining ratio at a high temperature, the high temperature charging efficiency and the cycle life characteristics, as compared to the battery wherein the x value is less than 0.03 (Example 137). In addition, these batteries are excellent in respect of the large current discharge characteristics, as compared to the battery wherein the x value exceeds 4 (Example 138).

(4) As is apparent form the comparison between Example 129 and Example 139, when the nickel hydroxide used in the positive electrode has a value of a half width of 0.75°/2θ (Cu-Kα), the utilization of the active material in the positive electrode is lowered, and thus, lowering of the capacity maintaining ratio at a high temperature, lowering of the high temperature charging efficiency, lowering of the large current discharge characteristics and lowering of the cycle life characteristics are recognized.

(5) The cycle life characteristics in Example 134 are poor, as compared to those in Example 129. The reason for this is presumed to reside in that the consumption of the alkali electrolyte liquid at the initial charging becomes large due to the use of cobalt monoxide as a conductive material in the positive electrode.

EXAMPLE 140

In the production of the battery in Example 129, the amount of the alkali electrolyte liquid charged was reduced to 1.1 cm$^3$/Ah, and the volume of the positive electrode accommodated was increased so as to make up for the reduced amount of the alkali electrolyte liquid, to thereby assemble a battery.

The capacity became 1,830 mAh, that is, 8% larger than the capacity in Example 129. It is noted that the levels of the characteristics of this battery were similar to those in Example 129.

EXAMPLES 141 TO 162 AND COMPARATIVE EXAMPLES 62 AND 63

1. Preparation of Positive Electrode

Nickel sulfate, cobalt sulfate and zinc sulfate were dissolved in diluted sulfuric acid, and the pH of the resultant acidic solution was adjusted using an aqueous solution of potassium hydroxide and an aqueous ammonia, to thereby prepare a precipitate of nickel hydroxide containing cobalt and zinc. This precipitate was separated by filtration and dried, to thereby obtain a nickel hydroxide powder.

In this case, by changing the concentration of the solution used, the pH value and the reaction time, various nickel hydroxide powders having different average particle diameters were prepared.

Then, into 100 parts by weight of the nickel hydroxide powder were incorporated 5 parts by weight of a cobalt monoxide powder having an average particle diameter of 1 μm, 0.28 part by weight of carboxymethyl cellulose, 0.28 part by weight of sodium polyacrylate, 0.33 part by weight of polytetrafluoroethylene, and an appropriate amount of water, and the resultant mixture was thoroughly mixed, to thereby obtain a paste.

A nickel fiber substrate was filled with the obtained paste, followed by drying and press molding, to thereby produce a positive electrode.

In this instance, the amount of the filling paste was adjusted so that the capacity density of the positive electrode became 20 mAh/cm$^2$.

2. Preparation of Negative Electrode

A hydrogen storage alloy having a composition: LmNi$_{0.4}$Co$_{0.4}$Mn$_{0.3}$Al$_{0.3}$ was subjected to mechanical grinding, to thereby obtain a 200 mesh-pass (Tyler mesh) powder.

Then, into 100 parts by weight of the obtained powder were incorporated 0.5 part by weight of sodium polyacrylate, 0.125 part by weight of carboxymethyl cellulose, 1.0 part by weight of carbon black, and 2.5 parts by weight of a polytetrafluoroethylene dispersion (specific gravity: 1.5; solids content: 60 wt %), and the entire resultant mixture was mixed with 50 parts by weight of water, to thereby obtain a paste.

The obtained paste was applied to a nickel punched metal (opening ratio: 45%) and dried, followed by roll milling, to thereby produce an electrode of the hydrogen storage alloy (negative electrode).

3. Assembling of Battery

A separator obtained by graft-polymerizing acrylic acid on a nonwoven fabric mainly made of a polypropylene fiber was disposed between the above-mentioned positive electrode and negative electrode, to thereby obtain an electrode group. The electrode group was accommodated in a battery casing.

Separately, in a 1N aqueous lithium hydroxide solution were dissolved KOH, NaOH, $Na_2WO_4 \cdot 2H_2O$ and $H_2WO_4$ in various amount ratios, to thereby prepare various alkali electrolyte liquids.

Then, 2.8 ml of the prepared alkali electrolyte liquid was charged into the battery casing, and the casing was sealed up, to thereby assemble a cylindrical nickel-metal hydride secondary battery (size: 4/5A; rated capacity: 1700 mAh) having a structure shown in FIGURE.

4. Battery Characteristics

First, with respect to each of the batteries assembled, a 150% charging was conducted at room temperature at 0.1 C for 15 hours, and subsequently, a discharging was conducted at 0.2 C until the voltage of the battery became 1 V, to thereby effect an activation treatment.

With respect to the resultant battery, a charging was conducted at a current of 1 C until the voltage of the battery was lowered by 10 mV (−10 mV cut-charging), and subsequently, a discharging was conducted at 1 C until the voltage of the battery became 1 V. This charge-discharge cycle was repeated in three times, and with respect to the battery after the 3rd cycle, the discharge capacity was measured. The measured value was referred to as initial capacity.

Then, the charge-discharge cycle wherein the −10 mV cut-charging was conducted was repeated in fifty cycles, and the discharge capacity after discharging until the voltage became 1.1 V from the full charging stage was determined. The determined value was referred to as after-cycle capacity.

Then, the utilization of the active material and the capacity maintaining ratio were determined by making calculation based on the following formulae:

Utilization of active material (%)=(Initial capacity/Theoretical capacity of filling active material)×100

Capacity maintaining ratio (%)=(After-cycle capacity/Initial capacity at 1.1 V)×100.

Further, the battery was subjected to complete discharge at 1 C until the voltage became 1 V, and then, the environmental temperature was increased to 60° C., and after the battery temperature was confirmed to be consistent with the environmental temperature, the −10 mV cut-charging was conducted at 1 C, and then, a discharging was conducted at 1 C until the voltage of the battery became 1 V. The capacity at this point in time was referred to as 60° C. capacity.

Then, the high temperature charging efficiency was determined by making calculation based on the following formula:

High temperature charging efficiency (%)=(60° C. capacity/Initial capacity)×100.

Subsequently, each of the batteries which have been subjected to the measurements of the battery characteristics was dismounted, and the positive electrode was ground by a grinder and the nickel substrate was completely removed therefrom by a magnet, so that only the active material powder was separate.

SEM examination was made on each of the separated powders. On the SEM image, ten particles of the active material powder were randomly extracted, and the particle diameters were measured and the average value was determined. This average value was referred to as average particle diameter of the active material powder.

Further, the x value for the W element present in the battery was measured in the same manner as in Example 1.

The results were summarized and shown in Table 15.

TABLE 15

| | Na content of active material powder (% by weight) | W element in battery (x value) | Average particle diameter of active material ($\mu$m, average value) | Initial utilization of active material (%) | Capacity maintaining rate (%) | Charging efficiency at 60° C. (%) |
|---|---|---|---|---|---|---|
| Example 141 | 10.0 | 0.03 | 3.0 | 98 | 90 | 85 |
| Example 142 | 10.0 | 0.03 | 10.0 | 100 | 92 | 88 |
| Example 143 | 10.0 | 0.03 | 20.0 | 98 | 93 | 86 |
| Example 144 | 10.0 | 1.0 | 3.0 | 99 | 93 | 87 |
| Example 145 | 10.0 | 1.0 | 10.0 | 101 | 95 | 90 |
| Example 146 | 10.0 | 1.0 | 20.0 | 99 | 94 | 88 |
| Example 147 | 10.0 | 4.0 | 3.0 | 96 | 91 | 88 |
| Example 148 | 10.0 | 4.0 | 10.0 | 98 | 93 | 91 |
| Example 149 | 10.0 | 4.0 | 20.0 | 96 | 94 | 89 |
| Example 150 | — | 1.0 | 10.0 | 100 | 93 | 86 |
| Example 151 | 10.0 | 0.02 | 3.0 | 98 | 82 | 77 |
| Example 152 | 10.0 | 0.02 | 10.0 | 100 | 84 | 80 |
| Example 153 | 10.0 | 0.02 | 20.0 | 98 | 85 | 78 |
| Example 154 | 10.0 | 0.03 | 2.5 | 96 | 84 | 84 |
| Example 155 | 10.0 | 0.03 | 20.5 | 95 | 86 | 85 |
| Example 156 | 10.0 | 2.0 | 2.5 | 97 | 86 | 86 |
| Example 157 | 10.0 | 2.0 | 20.5 | 96 | 87 | 87 |
| Example 158 | 10.0 | 4.0 | 2.5 | 94 | 85 | 87 |
| Example 159 | 10.0 | 4.0 | 20.5 | 93 | 87 | 88 |
| Example 160 | 10.0 | 4.5 | 3.0 | 92 | 88 | 88 |
| Example 161 | 10.0 | 4.5 | 10.0 | 94 | 90 | 91 |
| Example 162 | 10.0 | 4.5 | 20.0 | 92 | 91 | 89 |
| Comparative Example 62 | 10.0 | — | 10.0 | 100 | 90 | 73 |
| Comparative Example 63 | — | — | 10.0 | 100 | 89 | 71 |

From Table 15, the following is apparent.

(1) In Comparative Examples 62 and 63 wherein a W element is not present in the battery, the high temperature charging efficiency is largely lowered, as compared to that in Examples.

(2) As is apparent from the comparison between a group of Examples 141 to 143 and a group of Examples 154 and 155, even when the x values for the W element in the battery are the same, in the former group, all of the utilization of the active material, the high capacity maintaining rate and the high temperature charging efficiency are improved.

This is because, in the former group, the average particle diameter of the active material is selected in the range of 3 to 20 μm.

INDUSTRIAL APPLICABILITY

As is apparent from the above description, the nickel-metal hydride secondary battery of the present invention exhibits high utilization of the active material and is unlikely to undergo self-discharge in a high temperature storage. Therefore, this battery is advantageous not only in that it exhibits excellent self-discharge characteristics and high capacity maintaining rate at a high temperature and can be charged at a high efficiency in a high temperature environment, and further has the above excellent characteristics in combination, but also in that it can exhibit a large current discharge. Accordingly, the nickel-metal hydride secondary battery of the present invention is greatly commercially advantageous as a driving power source in various electronic appliances, electric vehicles and the like, which are used in various temperature environments.

What is claimed is:

1. A nickel-metal hydride secondary battery comprising:
   a battery casing;
   an electrode group housed in said battery casing, said electrode group including a positive electrode having carried thereon an active material powder containing a nickel hydroxide, a negative electrode having carried thereon a hydrogen storage alloy powder, and a separator being disposed between the positive electrode and the negative electrode; and
   an alkali electrolyte liquid being sealed in said battery casing,
   wherein the alkali electrolyte liquid includes a W element and alkali metal elements including an Na element, and wherein the W element includes tungstic acid ions and the Na element include sodium ions.

2. The nickel-metal hydride battery according to claim 1, wherein the tungstic acid ions are adsorbed onto the positive electrode.

3. The nickel-metal hydride battery according to one of claims 1 and 2, which satisfies the relationships represented by the following formulae:

$$0.03 \leq x \leq 4$$
$$1.5 \leq y \leq -14x+70$$

wherein x represents a hundredfold value of the atomic ratio of said W element to the alkali metal elements present in said battery, and y represents a hundredfold value of the atomic ratio of said Na element to the alkali metal elements present in said battery.

4. The nickel-metal hydride secondary battery according to one of claims 1 and 2, wherein said active material powder has an average particle diameter of 3 to 20 μm.

5. The nickel-metal hydride secondary battery according to one of claims 1 and 2, wherein the nickel hydroxide further contains 3 to 10% by weight of zinc.

6. The nickel-metal hydride secondary battery according to one of claims 1 and 2, wherein said hydrogen storage alloy powder has a specific surface area of 0.05 to 0.2 m³/g.

7. The nickel-metal hydride secondary battery according to one of claims 1 and 2, wherein the amount of said alkali electrolyte liquid accommodated in said battery is 0.7 to 1.7 cm³/Ah relative to the theoretical capacity, in units of Ah, of said positive electrode.

8. A hybrid vehicle or an electric vehicle which has mounted therein the nickel-metal hydride secondary battery according to claim 1 as a driving power source.

9. A hybrid vehicle or an electric vehicle which has mounted therein the nickel-metal hydride secondary battery according to claim 2 as a driving power source.

10. A hybrid vehicle or an electric vehicle which has mounted therein the nickel-metal hydride secondary battery according to claim 3 as a driving power source.

11. A hybrid vehicle or an electric vehicle which has mounted therein the nickel-metal hydride secondary battery according to claim 4 as a driving power source.

12. A hybrid vehicle or an electric vehicle which has mounted therein the nickel-metal hydride secondary battery according to claim 5 as a driving power source.

13. A hybrid vehicle or an electric vehicle which has mounted therein the nickel-metal hydride secondary battery according to claim 6 as a driving power source.

14. A hybrid vehicle or an electric vehicle which has mounted therein the nickel-metal hydride secondary battery according to claim 7 as a driving power source.

15. A nickel-metal hydride secondary battery comprising:
    a battery casing;
    an electrode group housed in said battery casing, said electrode group including a positive electrode having carried thereon an active material powder containing a nickel hydroxide, a conductive coating layer including an Na-containing cobalt compound being formed on the surface of the active material powder and a weight ratio of Na elements contained in the Na-containing cobalt compound to the active material powder being 0.05 to 5% by weight, a negative electrode having carried thereon a hydrogen storage alloy powder, and a separator being disposed between the positive electrode and the negative electrode; and
    an alkali electrolyte liquid being sealed in said battery casing,
    wherein the alkali electrolyte liquid includes a W element and alkali metal elements, and wherein the W element includes tungstic acid ions,
    which satisfies the relationship represented by the following formula:

$$0.03 \leq x \leq 4$$

wherein x represents a hundredfold value of the atomic ratio of said W element to the alkali metal elements present in said battery.

16. The nickel-metal hydride secondary battery according to claim 15, wherein an Na element is simultaneously present in said battery.

17. The nickel-metal hydride secondary battery according to claim 15, wherein a weight ratio of said Na-containing cobalt compound to said active material powder is 0.5 to 20% by weight.

18. The nickel-metal hydride secondary battery according to claim 16, wherein a weight ratio of said Na-containing cobalt compound to said active material powder is 0.5 to 20% by weight.

19. A hybrid vehicle or an electric vehicle which has mounted therein the nickel-metal hydride secondary battery according to claim 15 as a driving power source.

20. A hybrid vehicle or an electric vehicle which has mounted therein the nickel-metal hydride secondary battery according to claim 16 as a driving power source.

21. A hybrid vehicle or an electric vehicle which has mounted therein the nickel-metal hydride secondary battery according to claim 17 as a driving power source.

22. A nickel-metal hydride secondary battery comprising:
an electrode group comprising a positive electrode having carried thereon an active material powder containing a nickel hydroxide, a negative electrode having carried thereon a hydrogen storage alloy powder, and a separator being disposed between the positive electrode and the negative electrode, said electrode group being sealed in a battery casing, together with an alkali electrolyte liquid,
wherein at least W element is present in said battery, and wherein said separator comprises a sheet-form member having an acid group introduced into the surface thereof.

23. The nickel-metal hydride secondary battery according to claim 22, wherein an Na element is simultaneously present in said battery.

24. The nickel-metal hydride secondary battery according to claim 22, wherein said acid group is a carboxyl group or a sulfonic group.

25. The nickel-metal hydride secondary battery according to claim 22, wherein the amount of said acid group is 0.5 to 2 meq/g in terms of a potassium ion-exchange capacity.

26. The nickel-metal hydride secondary battery according to claim 23, wherein the amount of said acid group is 0.5 to 2 meq/g in terms of a potassium ion-exchange capacity.

27. The nickel-metal hydride secondary battery according to claim 24, wherein the amount of said acid group is 0.5 to 2 meq/g in terms of a potassium ion-exchange capacity.

28. A hybrid vehicle or an electric vehicle which has mounted therein the nickel-metal hydride secondary battery according to claim 22 as a driving power source.

29. A hybrid vehicle or an electric vehicle which has mounted therein the nickel-metal hydride secondary battery according to claim 23 as a driving power source.

30. A hybrid vehicle or an electric vehicle which has mounted therein the nickel-metal hydride secondary battery according to claim 24 as a driving power source.

31. A hybrid vehicle or an electric vehicle which has mounted therein the nickel-metal hydride secondary battery according to claim 25 as a driving power source.

* * * * *